(12) United States Patent
Ohno et al.

(10) Patent No.: US 7,455,709 B2
(45) Date of Patent: Nov. 25, 2008

(54) HONEYCOMB STRUCTURAL BODY

(75) Inventors: Kazushige Ohno, Ibi-gun (JP);
Masafumi Kunieda, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 423 days.

(21) Appl. No.: 10/518,373

(22) PCT Filed: Jul. 15, 2004

(86) PCT No.: PCT/JP2004/010136

§ 371 (c)(1),
(2), (4) Date: Aug. 26, 2005

(87) PCT Pub. No.: WO2005/005018

PCT Pub. Date: Jan. 20, 2005

(65) Prior Publication Data

US 2006/0075731 A1    Apr. 13, 2006

(30) Foreign Application Priority Data

Jul. 15, 2003  (JP) ............................. 2003-197385
Nov. 5, 2003   (JP) ............................. 2003-376227

(51) Int. Cl.
*B01D 46/00* (2006.01)
*F01N 3/022* (2006.01)

(52) U.S. Cl. .................. 55/523; 55/282.3; 55/385.3; 55/482; 55/522; 55/524; 55/527; 55/DIG. 10; 55/DIG. 30; 60/311; 428/116

(58) Field of Classification Search .............. 55/282.2, 55/282.3, 385.3, 482, 486, 487, 522, 523, 55/524, DIG. 10, DIG. 30, 527; 60/297, 60/299, 301, 311; 422/168, 169, 170, 177, 422/180, 211, 212; 502/439; 428/116, 117, 428/118; 423/212, 213.2, 213.5, 213.7
See application file for complete search history.

(56) References Cited

U.S. PATENT DOCUMENTS 3,233,697 A    2/1966  Slayter et al.

(Continued)

FOREIGN PATENT DOCUMENTS

EP    0 369 163    5/1990

(Continued)

OTHER PUBLICATIONS

U.S. Appl. No. 09/926,795.

(Continued)

*Primary Examiner*—Jason M Greene
(74) *Attorney, Agent, or Firm*—Oblon, Spivak, McClelland, Maier & Neustadt, P.C.

(57) ABSTRACT

An object of the present invention is to provide a honeycomb structural body for use in a filter, which can support a large amount of catalysts, can suppress increase in pressure loss upon collecting particulates, can have a high particulate collecting capability and can efficiently carry out a regenerating process and a toxic gas purifying process. The honeycomb structural body according to the present invention is a pillar-shaped honeycomb structural body having a structure in which a plurality of through holes are placed in parallel with one another in the length direction with a partition wall interposed therebetween, wherein lamination members are laminated in the length direction so that the through holes are superposed on one another, and one of ends of each through hole is sealed.

14 Claims, 9 Drawing Sheets

U.S. PATENT DOCUMENTS

| | | | | |
|---|---|---|---|---|
| 3,785,781 | A | * | 1/1974 | Hervert et al. ............... 422/180 |
| 4,293,357 | A | | 10/1981 | Higuchi et al. |
| 4,560,478 | A | | 12/1985 | Narumiya |
| 4,652,286 | A | | 3/1987 | Kusuda et al. |
| 4,824,711 | A | | 4/1989 | Cagliostro et al. |
| 5,026,611 | A | * | 6/1991 | Usui et al. .................. 502/439 |
| 5,415,715 | A | | 5/1995 | Delage et al. |
| 5,446,264 | A | | 8/1995 | Kondo et al. |
| 5,497,620 | A | | 3/1996 | Stobbe |
| 5,514,347 | A | * | 5/1996 | Ohashi et al. ............... 422/180 |
| 5,573,919 | A | | 11/1996 | Kearns et al. |
| 5,693,230 | A | | 12/1997 | Asher |
| 5,914,187 | A | | 6/1999 | Naruse et al. |
| 5,930,994 | A | | 8/1999 | Shimato et al. |
| 6,165,244 | A | | 12/2000 | Choi |
| 6,217,831 | B1 | * | 4/2001 | Suzuki et al. ............... 422/180 |
| 6,267,898 | B1 | | 7/2001 | Fukuda et al. |
| 6,387,144 | B1 | | 5/2002 | Jaroszczyk et al. |
| 6,447,564 | B1 | | 9/2002 | Ohno et al. |
| 6,565,630 | B2 | | 5/2003 | Ohno et al. |
| 6,669,751 | B1 | | 12/2003 | Ohno et al. |
| 6,764,527 | B2 | * | 7/2004 | Ishihara et al. ................ 55/523 |
| 6,770,116 | B2 | | 8/2004 | Kojima |
| 7,090,714 | B2 | * | 8/2006 | Otsubo et al. ................. 55/523 |
| 2001/0010153 | A1 | | 8/2001 | Setoguchi et al. |
| 2002/0078669 | A1 | | 6/2002 | Shimoda et al. |
| 2002/0141912 | A1 | | 10/2002 | Murrell et al. |
| 2003/0000188 | A1 | | 1/2003 | Harada et al. |
| 2003/0089092 | A1 | | 5/2003 | Bause et al. |
| 2004/0031264 | A1 | | 2/2004 | Kojima |
| 2004/0033175 | A1 | | 2/2004 | Ohno et al. |
| 2004/0055265 | A1 | | 3/2004 | Ohno et al. |
| 2004/0161596 | A1 | | 8/2004 | Taoka et al. |
| 2004/0223892 | A1 | | 11/2004 | Kojima |
| 2005/0011174 | A1 | | 1/2005 | Hong et al. |
| 2005/0016140 | A1 | | 1/2005 | Komori et al. |
| 2005/0016141 | A1 | | 1/2005 | Hong et al. |
| 2006/0075731 | A1 | | 4/2006 | Ohno et al. |

FOREIGN PATENT DOCUMENTS

| | | | |
|---|---|---|---|
| EP | 1 125 704 | A1 | 8/2001 |
| EP | 1 142 619 | | 10/2001 |
| EP | 1 231 363 | A2 | 8/2002 |
| EP | 1 262 641 | A1 | 12/2002 |
| EP | 1 375 849 | A2 | 1/2004 |
| EP | 1 419 816 | A1 | 5/2004 |
| EP | 1 520 614 | A1 | 4/2005 |
| JP | 4-2673 | | 1/1992 |
| JP | H5-306614 | | 11/1993 |
| JP | 6-182228 | | 7/1994 |
| JP | 6-257422 | | 9/1994 |
| JP | 6-294313 | | 10/1994 |
| JP | H7-213835 | | 8/1995 |
| JP | 08-012460 | | 1/1996 |
| JP | 8-12460 | * | 1/1996 |
| JP | 08-028246 | | 1/1996 |
| JP | 08-028248 | | 1/1996 |
| JP | 8-290963 | | 11/1996 |
| JP | 9-49420 | | 2/1997 |
| JP | 10-249968 | | 9/1998 |
| JP | 10-263343 | | 10/1998 |
| JP | 2001-252529 | | 9/2001 |
| JP | 2002-239345 | | 8/2002 |
| JP | 2002-336627 | | 11/2002 |
| JP | 2002-349230 | | 12/2002 |
| JP | 2003-1029 | | 1/2003 |
| JP | 2003-001067 | | 1/2003 |
| KR | 2001-0080918 | | 8/2001 |
| WO | 03/068363 | | 8/2003 |

OTHER PUBLICATIONS

U.S. Appl. No. 10/129,126.
U.S. Appl. No. 10/502,045, filed Jul. 29, 2004, Kudo et al.
U.S. Appl. No. 10/502,054, filed Nov. 12, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 10/521,592, filed Jan. 18, 2005, Ohno et al.
U.S. Appl. No. 11/363,173.
U.S. Appl. No. 11/563,512.

* cited by examiner

Fig. 1
(a)
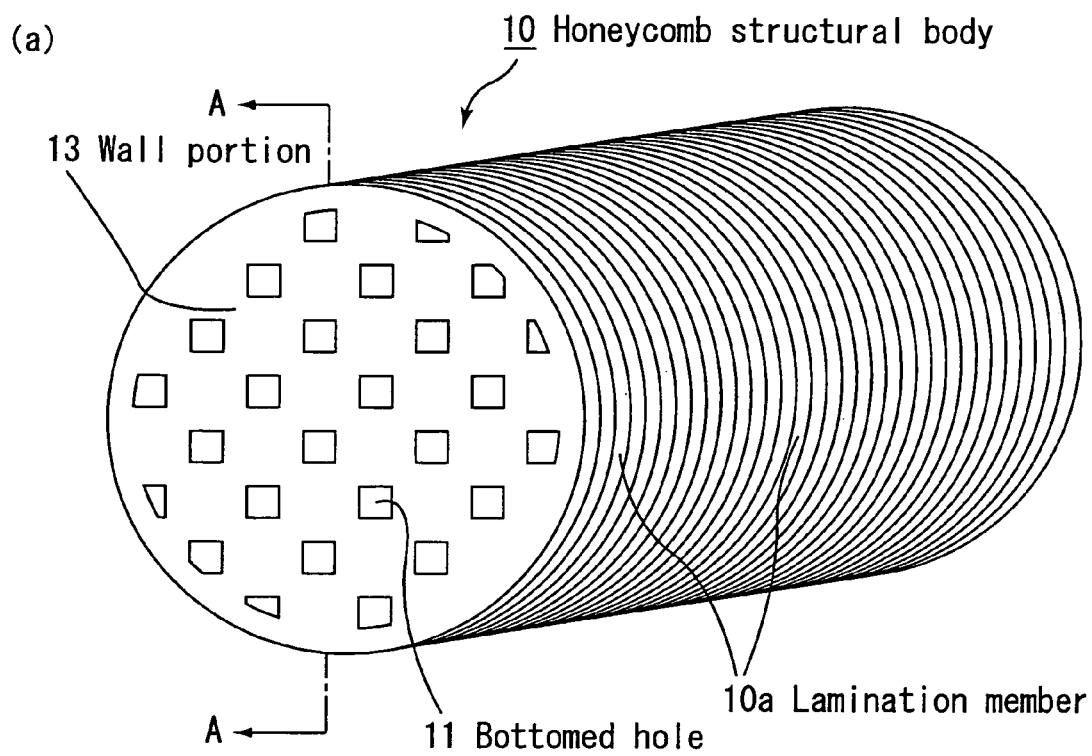
10 Honeycomb structural body
13 Wall portion
11 Bottomed hole
10a Lamination member
(b)
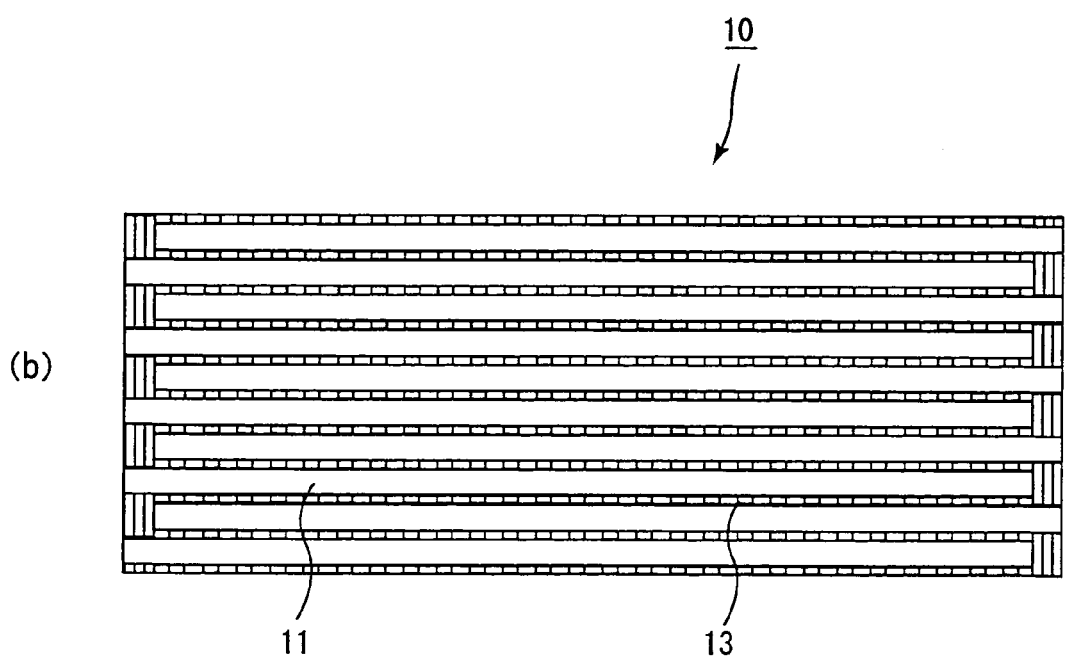

Fig. 7
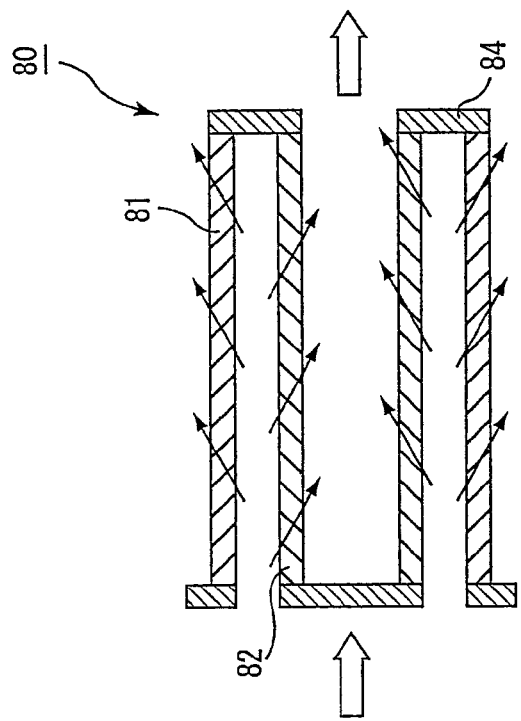
(a)
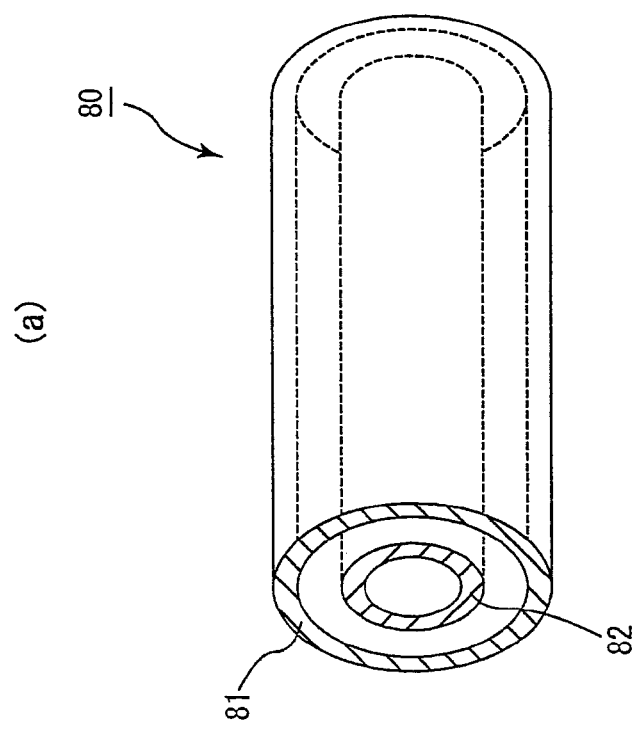
(b)

HONEYCOMB STRUCTURAL BODY

TECHNICAL FIELD

This application claims benefit of priority to Japanese Patent Application No. 2003-197385, filed on Jul. 15, 2003, and Japanese Patent Application No. 2003-376227, filed on Nov. 5, 2003, the contents of which are incorporated by reference herein.

The present invention relates to a honeycomb structural body that is used in order to remove particulates, etc. contained in exhaust gases discharged from an internal combustion engine such as a diesel engine.

BACKGROUND ART

Recently, particulates, such as soot, contained in exhaust gases that are discharged from internal combustion engines of vehicles, such as buses and trucks, and construction machines, have raised serious problems as those particulates are harmful to the environment and the human body. Conventionally, various filters, which are used for collecting particulates in exhaust gases so as to purify the exhaust gases, have been proposed, and filters having a honeycomb structure have also been proposed.

FIG. 4 is a perspective view that shows one type of filter having such a honeycomb structure.

This honeycomb filter 60, which is prepared as a honeycomb structural body made from silicon carbide and the like, has a structure in which a plurality of square-pillar shaped porous ceramic members 70 are combined with one another through sealing material layer 64 that serve as a bonding agent to form a ceramic block 65, and a sealing material layer 63 is also formed on the circumference of this ceramic block 65.

FIG. 5(a) is a perspective view that schematically shows the porous ceramic member constituting the honeycomb filter shown in FIG. 4, and FIG. 5(b) is a cross-sectional view taken along line B-B of the porous ceramic member shown in FIG. 5(a).

The porous ceramic member 70 has a honeycomb structure in which a partition wall 73, which separates a large number of through holes 71 that are placed in parallel with one another in the length direction, serves as a filter.

In other words, as shown in FIG. 5(b), each of the through holes 71, formed in the porous ceramic member 70, is sealed with a plug 72 at either of ends of its exhaust gas inlet side or outlet side so that exhaust gases that have entered one through hole 71 are discharged from another through hole 71 after having always passed through each partition wall 73 that separates the through holes 71.

Here, the sealing material layer 63 formed on the circumference is placed in order to prevent exhaust gases from leaking from the peripheral portion of the ceramic block 65, when the honeycomb filter 60 is installed in an exhaust passage of an internal combustion engine.

When the honeycomb filter 60 having such a structure is placed in the exhaust passage of an internal combustion engine, particulates in exhaust gases discharged from the internal combustion engine are captured by the partition wall 73 upon passing through the honeycomb filter 60 so that the exhaust gases are purified.

A filter having such a honeycomb structure, which can collect particulates in exhaust gases, is also designed so that a catalyst used for purifying exhaust gases is adhered to a portion (through holes and the like) functioning as a filter; thus, the filter makes it possible to purify toxic components such as CO, HC and NOx in exhaust gases, to accelerate activation of oxygen, NOx, etc. by the catalyst, and also to reduce activation energy for burning particulates adhered to the catalyst so that the particulates can be burned at low temperatures.

Conventionally, with respect to the filter having the honeycomb structure to which the catalyst is attached, a porous ceramic honeycomb structure formed by refractory particles made from silicon carbide, cordierite or the like has been widely used, and a structural body in which a plurality of porous ceramic members are combined with one another in the length direction through a bonding agent, a structural body which is formed through an extrusion molding process into an integral structure made from ceramics and the like have been generally used (for example, see Patent Document 1).

With respect to the above-mentioned filter using a catalyst, it is preferable to increase reaction sites between the particulates and the catalyst. In order to achieve this structure, it is effective to increase the porosity in a wall portion constituting the honeycomb structural body so that a large number of open pores are included therein; thus, more particulates are collected also in the inner side of the wall portion (hereinafter, referred to as deep-layer filtration) so that the particulates are also made in contact with the catalyst adhered to the inner side of the wall portion.

However, when the above-mentioned methods are used in the porous ceramic honeycomb structural body made from refractory particles, the strength of the filer becomes very low. For this reason, upon burning and removing collected particulates (hereinafter, referred to as a regenerating process) in such a filter, the filter tends to generate a great temperature difference in the length direction of the filter due to the burning process of the particulates, resulting in damages such as cracks in the filter due to the resulting thermal stress. Consequently, the above-mentioned filter tends to lose functions as the filter.

Moreover, with respect to the filter having a honeycomb structure to which a catalyst is applied, a honeycomb structural body manufactured by extrusion-molding a mixture containing inorganic fibers such as alumina and silica, and a honeycomb structural body which is manufactured by corrugating inorganic sheets, which is obtained from inorganic fibers through a paper-making process, have been known (for example, see Patent Documents 2 and 3).

In addition to these, with respect to the filter having a honeycomb structure to which a catalyst is applied, a honeycomb structural body using a metal porous material has also been known (for example, see Patent Documents 4 to 6).

Although the honeycomb structural body using the metal porous material is capable of maintaining sufficient strength even when the porosity is increased, the filtering area becomes very small because of its structure to cause a high flowing rate in exhaust gases upon passing through the filter wall portion and the subsequent high pressure loss in the filter.

Here, with respect to the filter having a honeycomb structure to which a catalyst is applied, a honeycomb structural body in which a plurality of honeycomb ceramic modules, each having a predetermined thickness, are placed with open-hole cells communicating with each other has also been proposed (for example, see Patent Document 7).

Such a honeycomb structural body formed by placing a plurality of the honeycomb ceramic modules makes it possible to alleviate a thermal stress caused by a temperature difference in the filter length direction.

Regarding the honeycomb ceramic modules which forms a honeycomb structural body by placing a plurality of those, the honeycomb ceramic modules formed by extrusion-molding a mixture containing refractory particles and inorganic fibers made from alumina, silica and the like, into a honeycomb structure and then firing the resulting formed body; and the honeycomb ceramic modules formed by perforating inorganic sheets, which are prepared by subjecting inorganic fibers to papermaking process, to form a honeycomb shape have been known.

However, the honeycomb filter constituted by the former honeycomb ceramic modules has no plugged portions, resulting in degradation in the particulate collecting efficiency.

Moreover, the filter having a honeycomb structure is normally used at high temperatures while it is put into a casing (metal container); however, in the case where the former honeycomb structural body formed by placing a plurality of honeycomb ceramic modules is directly put into the casing, since its coefficient of thermal expansion is greatly different from that of the casing (metal container), gaps occur between the modules and the casing (metal container) located on the circumference thereof as well as between the honeycomb ceramic modules; thus, exhaust gases flow out through the gaps, resulting in a leak of collected particulates and the subsequent reduction in the particulate collecting efficiency.

Patent Document 1: JP-A 06-182228 (1994)
Patent Document 2: JP-A 04-2674 (1992)
Patent Document 3: JP-A 2001-252529
Patent Document 4: JP-A 06-257422 (1994)
Patent Document 5: JP-A 06-294313 (1994)
Patent Document 6: JP-A 09-49420 (1997)
Patent Document 7: JP-A 08-12460 (1996)

DISCLOSURE OF THE INVENTION

Problems to be Solved by the Invention

The present invention has been devised so as to solve the above-mentioned problems, and its objective is to provide a honeycomb structural body which has a high collecting efficiency of particulates, and is less likely to be damaged even when a porosity is increased, and can be used for a long time. Moreover, another objective of the present invention is to provide a honeycomb structural body which can reduce a pressure loss after particulates have been collected. The other objective of the present invention is to provide a honeycomb structural body which can be adjusted into a complex shape.

Means for Solving the Problems

A honeycomb structural body in accordance with a first aspect of the present invention is a pillar-shaped honeycomb structural body having a structure in which a plurality of through holes are placed in parallel with one another in the length direction with a partition wall interposed therebetween, wherein lamination members are laminated in the length direction so that the through holes are superposed on one another, and one of ends of each through hole is sealed.

A honeycomb structural body in accordance with a second aspect of the present invention is a pillar-shaped honeycomb structural body having a structure in which a plurality of through holes are placed in parallel with one another in the length direction with a partition wall interposed therebetween, wherein lamination members are laminated in the length direction so that the through holes are superposed on one another, and at least the lamination members positioned on both end faces of the honeycomb structural body are mainly made of metal.

In the honeycomb structural body of the second aspect of the present invention, preferably, all the lamination members are mainly made of metal. Moreover, in the honeycomb structural body of the second aspect of the present invention, preferably, each of a plurality of the through holes is sealed at one of the ends of the honeycomb structural body, and the honeycomb structural body functions as a filter.

In the honeycomb structural bodies of the first and second aspects of the present invention, preferably, a catalyst is supported on the lamination members.

The honeycomb structural bodies of the first and second aspects of the present invention preferably function as exhaust gas purifying filters.

The honeycomb structural bodies of the first and second aspects of the present invention are in common with each other in that each of them has a pillar-shaped honeycomb structural body in which a plurality of through holes are placed in parallel with one another in the length direction with a partition wall interposed therebetween, and in that lamination members are laminated in the length direction so that the through holes are superposed on one another; however, the honeycomb structural body of the first aspect of the present invention has a structure in which one of the ends of each through hole is sealed, while the honeycomb structural body of the second aspect of the present invention does not necessarily have the structure in which one of the ends of each through hole is sealed, which makes the two honeycomb structural bodies different from each other. Also, the honeycomb structural body of the second aspect of the present invention has a structure in which at least the lamination members positioned on both end faces of the honeycomb structural body are mainly made of metal, while the honeycomb structural body of the first aspect of the present invention does not have any limitation in the material of the lamination members positioned on both end faces of the honeycomb structural body, which makes the two honeycomb structural bodies different from each other.

However, since the first and second aspects of the present invention are in common with each other in that the honeycomb structural body is used, the following description will mainly discuss the honeycomb structural body of the first aspect of the present invention in which one of the ends of each through hole is sealed so as to function as a collecting filter, as the honeycomb structural body of the present invention. And, the limitation and the like of the position of the metal members and the honeycomb structural body that does not have a structure in which one of the ends of each through hole is sealed will be described on demand in the following description.

Effects of the Invention

The honeycomb structural body (filter) of the present invention, which has a structure in which lamination members are laminated in the length direction so that the through holes are superposed on one another, with one of the ends of each through hole being sealed, makes it possible to improve the collecting efficiency. Moreover, since the flow of exhaust gases can be changed, deep-layer filtering processes in the inner side of the wall portion can be executed so that the pressure loss after particulate collection is reduced.

Moreover, in the honeycomb structural body, upon regenerating process, a great temperature difference occurs in the length direction of the filter due to burning processes of particulates to cause a great thermal stress on the filter; however, the honeycomb structural body of the present invention has a structure in which lamination members are laminated in the length direction so that, even when a great temperature difference occurs in the entire filter, a temperature difference occurring in each of the lamination members is comparatively small and the resulting thermal stress is also small, thereby making the honeycomb structural body less likely to be damaged. Consequently, even continuous regenerating processes can be carried out on the honeycomb structural body of the present invention and thus the honeycomb structural body can be used for a long time. Moreover, in the case where the filter is designed to have a complex shape, a uniform temperature response tends to be disturbed to cause a temperature difference in the filter, making the filter very weak to the thermal stress; however, even when formed into a complex shape, the honeycomb structural body of the present invention is less likely to be damaged.

Moreover, since the honeycomb structural body of the present invention has a structure in which lamination members are laminated in the length direction, it is possible to freely change the amount of deposition of the catalyst in the length direction and the kind of the catalyst in accordance with the application. Consequently, the honeycomb structural body of the present invention makes it possible to improve the regenerating process and purifying functions for toxic gases. In this case, it is not necessarily required to have the structure in which one of the ends of each through hole is sealed in the honeycomb structural body.

Here, in the honeycomb structural body of the present invention, it is possible to easily form irregularities on the surface of the wall portion of the honeycomb structural body by laminating lamination members having different shapes and/or sizes of the through holes alternately or at random. Thus, the irregularities formed on the surface of the wall portion make it possible to increase the filtering area and consequently to reduce a pressure loss upon collecting particulates. Moreover, the irregularities allow the exhaust gas flow to form a turbulent flow so that the catalyst is effectively made in contact with toxic gas components and particulates in exhaust gases; thus, it becomes possible to improve the purifying performance of exhaust gases and the purifying rate for particulates upon regenerating process. Moreover, by forming the exhaust gas flow into a turbulent flow, it becomes possible to reduce a temperature difference in the filter, and consequently to effectively prevent damages due to thermal stress.

When the honeycomb structural body of the present invention is designed such that at least the lamination members positioned on both end faces of the honeycomb structural body are mainly made of metal, it is possible to reduce wind erosion even after a long-term use. Moreover, it is possible to prevent occurrence of a gap to the casing (metal container) and a gap between the respective lamination members at high temperatures (during use) due to a difference in thermal expansion from that of the casing (metal container), and consequently to prevent a leak of particulates in exhaust gases and the subsequent reduction in the collecting efficiency for particulates. Moreover, since the strength in the end faces is increased, it becomes possible to prevent damages in the filter due to exhaust gas pressure and the like imposed on the end faces during use.

When all the lamination members of the honeycomb structural body of the present invention are mainly made of metal, a high porosity is achieved in the entire honeycomb structural body while realizing a low pressure loss, making it possible to ensure sufficient strength. Moreover, it is possible to prevent occurrence of a gap to the casing (metal container) and a gap between the respective lamination members at high temperatures (during use) due to a difference in thermal expansion from that of the casing (metal container). Moreover, since metal is superior in thermal conductivity, it is possible to improve the heat-averaging property, and consequently to improve the purifying rate of particulates upon regenerating process. Furthermore, when a high porosity is achieved, the thermal capacity is reduced so that a quick temperature rise is available by the use of exhaust heat emitted from the internal combustion engine; therefore, this structure is particularly beneficial when the filter is placed right under an engine so as to effectively utilize the exhaust heat.

When the honeycomb structural body of the present invention is designed to have sealed portions and the like, the honeycomb structural body is placed in an exhaust gas purifying device or the like, and may be used as a filter for purifying particulates.

In the present honeycomb structural body, when a catalyst is supported on the lamination members, it can be used as a catalyst supporting member to be used for purifying toxic gas components in exhaust gases in an exhaust gas purifying device and the like. Moreover, when the honeycomb structural body of the present invention is also allowed to function as a filter for collecting particulates, it becomes possible to accelerate the burning and removing processes of collected particulates.

BEST MODE FOR CARRYING OUT THE INVENTION

The honeycomb structural body of the first aspect of the present invention is a pillar-shaped honeycomb structural body having a structure in which a plurality of through holes are placed in parallel with one another in the length direction with a partition wall interposed therebetween, wherein lamination members are laminated in the length direction so that the through holes are superposed on one another, and one of ends of each through hole is sealed.

The honeycomb structural body of the first aspect of the present invention also functions as a filter for collecting particulates, and when designed so that a catalyst is adhered to the through holes and the like, it is allowed to function as a filter for collecting particulates and a purifying device for toxic gases.

The honeycomb structural body of the second aspect of the present invention is a pillar-shaped honeycomb structural body having a structure in which a plurality of through holes are placed in parallel with one another in the length direction with a partition wall interposed therebetween, wherein lamination members are laminated in the length direction so that the through holes are superposed on one another, and at least the lamination members positioned on both end faces of the honeycomb structural body are mainly made of metal.

In the honeycomb structural body of the present invention, the above-mentioned plurality of through holes may be formed by only normal through holes without sealed ends, or may include through holes with one of ends being sealed (hereinafter, referred to as bottomed hole). In the case where the through holes are designed to include bottomed through holes, the honeycomb structural body of the present invention also functions as a filter for collecting particulates, and in the case where designed so that a catalyst is adhered to the through holes and the like, it is allowed to function as a filter for collecting particulates and a purifying device for toxic gases. Moreover, in the case where the through holes are formed by only the normal through holes, a catalyst is adhered to the through holes and the like so that the honeycomb structural body of the present invention is allowed to function as a toxic gas purifying device.

FIG. 1(a) is a perspective view that schematically shows a specific example of a honeycomb structural body of the present invention, and FIG. 1(b) is a cross-sectional view taken along line A-A of FIG. 1(a).

A honeycomb structural body 10 is a cylindrical honeycomb structural body that has a structure in which a large number of through holes 11, each having one of ends being sealed, are placed in parallel with one another in the length direction with a partition wall interposed therebetween.

In other words, as shown in FIG. 1(b), each of the bottomed holes 11 is sealed at one of ends on its exhaust gas inlet side or outlet side so that exhaust gases that have entered one bottomed hole 11 are discharged from another bottomed hole 11 after having always passed through each partition wall 13 that separates the bottomed holes 11; thus, the partition wall 13 is allowed to function as a filter.

As shown in FIG. 1, the honeycomb structural body of the present invention is a laminated member constituted by laminating lamination members 10a each having a thickness of 0.1 to 20 mm, and the lamination members 10a are laminated so that the through holes 11 are superposed on one another in the length direction.

Here, the expression, "lamination members are laminated so that through holes are superposed on one another", refers to the fact that the lamination is made so that through holes, formed in adjacent laminated members, communicate with each other.

The lamination members may be mutually bonded to one another by using an inorganic bonding agent or the like, or may be simply laminated physically; however, it is preferable for the lamination members to be simply laminated physically. When they are simply laminated physically, it is possible to prevent a flow of exhaust gases from being interrupted by a joining portion made from the bonding agent and the like to cause an increase in pressure losses. Here, in the case where the respective lamination members are simply laminated physically, the lamination members need to be laminated in a casing (metallic cylindrical body) to be attached to an exhaust pipe, and pressure is applied thereto.

As shown in FIG. 1, the honeycomb structural body of the present invention has a structure in which lamination members are laminated in the length direction so that the through holes are superposed on one another, with one of the ends of each through hole being sealed. This structure makes it possible to improve the collecting efficiency in comparison with the structure having no sealed portion. Moreover, a deep-layer filtering process can be carried out more easily. The mechanism for this has not been sufficiently clarified; however, it is presumably explained as follows:

FIG. 9(a) is an enlarged cross-sectional view (see FIG. 1) that schematically shows a wall portion 13 located between a through hole 11 and another through hole 11 of the honeycomb structural body 10 according to the present invention, and FIG. 9(b) is a cross-sectional view (see FIG. 5) that schematically shows a wall portion 73 located between a through hole 71 and another through hole 71 of a honeycomb structural body 60 made of a ceramic material, which continuously extends in the length direction. Here, the horizontal direction of FIG. 9 corresponds to the length direction of the honeycomb structural body.

In the honeycomb structural body 60 shown in FIG. 9(b), gas 66 is allowed to flow in various directions randomly through pores 73b located between particles 73a, and since the honeycomb structural body 10, shown in FIG. 9(a), has a structure in which lamination members 10a made of porous members are laminated on one another, discontinuous faces exist between the particles 13a and the pores 13b. Consequently, the gas 16 flows while avoiding the discontinuous faces. In other words, the gas 16 tends to flow perpendicularly to the wall portion 13 so that particulates are deep-layer-filtered in the inner portion of the wall. For this reason, the pressure loss after collection of particulates is further lowered. Moreover, in the case where a catalyst used for burning particulates is supported thereon, the possibility of contact between particulates that have been deep-layer-filtered and the catalyst that has been supported in the inner portion of the wall becomes higher, providing high burning efficiency for the catalyst.

Further, the honeycomb structural body has the structure in which the lamination members are laminated in the length direction; therefore, even when a great temperature difference occurs in the entire filter upon regenerating process, a temperature difference occurring in each of the lamination members is comparatively small and the resulting thermal stress is also small, thereby making the honeycomb structural body less likely to be damaged. Moreover, in the case where the filter is designed to have a complex shape, the filter tends to become very weak to the thermal stress; however, even when formed into a complex shape, the honeycomb structural body of the present invention is less likely to be damaged.

Moreover, all the lamination members, forming the honeycomb structural body of the present invention, may be formed by the same material, or may be laminated by using members made from different materials collectively, and although not particularly limited, at least the lamination members located on both of the end faces of the honeycomb structural body are mainly made of metal or ceramics preferably. The honeycomb structural body having such a structure is less likely to be suffered from wind erosion even after a long term use. In particular, when at least the lamination members located on both of the end faces of the honeycomb structural body are mainly made of metal, it is possible to prevent occurrence of a gap to the casing (metal container) and a gap between the respective lamination members at high temperatures (during use) due to a difference in thermal expansion from that of the casing (metal container), and consequently to prevent a leak of particulates in exhaust gases and the subsequent reduction in the collecting efficiency for particulates. Moreover, since the strength in the end faces is increased, it becomes possible to prevent damages in the filter due to exhaust gas pressure and the like imposed on the end faces during use, and consequently to carry out continuous regenerating processes.

As described above, with respect to the material for forming the lamination members, not particularly limited, for example, metals, porous ceramics, inorganic fibers and the like can be used.

In the case where metal is used as the material for forming the lamination members, with respect to the kinds of the metal, not particularly limited, for example, chromium-based stainless, chromium-nickel-based stainless and the like may be used.

With respect to the above-mentioned metal, metal having a porous structure is preferably used so as to allow the honeycomb structural body of the present invention to function as a filter.

In other words, the lamination member mainly made of metal is preferably prepared as a structural body formed by three-dimensionally assembled metal fibers made of the above-mentioned metal, or a structural body made of the above-mentioned metal with through pores being formed by a pore-forming material, or a structural body formed by sintering metal powder made of the above-mentioned metal in a manner so as to leave pores.

With respect to the porosity of the lamination members mainly made of metal, although not particularly limited, a preferable lower limit value is set to 50% by volume and a preferable upper limit value is set to 98% by volume. The porosity of less than 50% by volume tends to fail to carry out the deep-layer filtering process in the inner side of the wall portion, or causes degradation in the temperature raising property. In contrast, the porosity exceeding 98% by volume tends to cause degradation in the strength of the lamination members mainly made of metal, and consequently makes the lamination members less likely to be damaged. More preferably, the lower limit value is set to 70% by volume and the upper limit value is set to 95% by volume.

Moreover, with respect to the average pore diameter of the lamination members mainly made of metal, although not particularly limited, a preferable lower limit value is set to 1 μm, and a preferable upper limit value is set to 100 μm. The average particle size of less than 1 μm tends to cause clogging in the inner side of the wall portion, failing to carry out the deep-layer filtering process. In contrast, the average particle size exceeding 100 μm makes particulates easily pass through the pores to cause degradation in the particulate-collecting efficiency.

Here, the porosity and average particle diameter can be measured through known methods, such as measurements using a mercury porosimeter, a weighing method, Archimedes method and a measuring method using a scanning electronic microscope (SEM)

In the honeycomb structural body of the present invention, when all the lamination members are mainly made of metal, it becomes possible to ensure sufficient strength even when the entire structure has a high porosity. Moreover, it becomes possible to effectively prevent occurrence of a gap to the casing (metal container) and a gap between the respective lamination members at high temperatures (during use) due to a difference in thermal expansion from that of the casing (metal container) Furthermore, since the metal is superior in thermal conductivity, it is possible to improve the heat-averaging property, and consequently to improve the purifying rate of particulates upon regenerating process. In addition, when a high porosity is achieved, the thermal capacity is reduced so that a quick temperature rise is available by using exhaust heat discharged from an internal combustion engine; therefore, this structure is particularly beneficial when the filter is placed right under an engine so as to effectively utilize the exhaust heat.

Here, in the honeycomb structural body of the present invention, for example, a structure may be adopted, in which several lamination members mainly made of metal are respectively used on both of ends, with lamination members mainly made of inorganic fibers or lamination members mainly made from a porous ceramic material being used in the center.

Moreover, these members may be properly combined with one another, or one of these materials may be used alone.

With respect to the material for the inorganic fibers forming the lamination members mainly made from inorganic fibers, examples thereof include oxide ceramics such as silica-alumina, mullite, alumina, silica and the like, nitride ceramics such as aluminum nitride, silicon nitride, boron nitride, titanium nitride and the like and carbide ceramics such as silicon carbide, zirconium carbide, titanium carbide, tantalum carbide, tungsten carbide and the like. Each of these may be used alone, or two or more kinds of these may be used in combination.

With respect to the fiber length of the inorganic fibers, a preferable lower limit value is set to 0.1 mm and a preferable upper limit value is set to 100 mm, more preferably, the lower limit value is set to 0.5 mm and the upper limit value is set to 50 mm. A preferable lower limit value of the inorganic fiber diameter is set to 1 μm, and a preferable upper limit value thereof is set to 30 μm, more preferably, the lower limit value is set to 2 μm and the upper limit value is set to 20 μm.

In addition to the above-mentioned inorganic fibers, the lamination members mainly made of inorganic fibers may contain a binder used for combining the inorganic fibers with one another so as to maintain a predetermined shape.

With respect to the above-mentioned binder, not particularly limited, inorganic glass, such as silicate glass, silicate alkali glass and borosilicate glass, alumina sol, silica sol, titania sol and the like may be used.

In case of including the binder, with respect to the content of the binder, a preferable lower limit value is set to 5% by weight and a preferable upper limit value is set to 50% by weight; more preferably, the lower limit value is set to 10% by weight and the upper limit value is set to 30% by weight; most preferably, the upper limit value is set to 20% by weight.

The lamination members, mainly made from inorganic fibers, may contain inorganic particles and/or metal particles. With respect to the material for the inorganic particles, examples thereof include carbides, nitrides and oxides, and, specific examples thereof include silicon carbide, silicon nitride, boron nitride, alumina, silica, zirconia, titania and the like. With respect to the material for the metal particles, examples thereof include metallic silicon, aluminum, iron and titanium. Each of these may be used alone, or two or more kinds of these may be used in combination.

With respect to the apparent density of the lamination members mainly made of inorganic fibers, a preferable lower limit value is set to 0.05 g/cm$^3$ and a preferable upper limit value is set to 1.00 g/cm$^3$; more preferably, the lower limit value is set to 0.10 g/cm$^3$ and the upper limit value is set to 0.50 g/cm$^3$.

Moreover, with respect to the porosity of the lamination members mainly made from inorganic fibers, a preferable lower limit value is set to 50% by volume and a preferable upper limit value is set to 98% by volume; and more preferably, the lower limit value is set to 60% by volume and the upper limit value is set to 95% by volume, most preferably, the lower limit value is set to 80% by volume.

The porosity of not less than 50% allows particulates to penetrate the honeycomb structural body deeper and consequently to be easily filtered; therefore, the catalyst deposited inside the wall and the particulates are easily made in contact with each other to improve the reactivity. Here, the porosity exceeding 98% by volume tends to cause insufficient strength.

Here, the apparent density can be measured through known methods, such as a weighing method, Archimedes method and a measuring method using a scanning electronic microscope (SEM).

The lamination members mainly made from inorganic fibers may be easily obtained through a paper-making method or the like.

With respect to the porous ceramic material for forming the lamination members mainly made from porous ceramics, examples thereof include: nitride ceramics such as aluminum nitride, silicon nitride, boron nitride and titanium nitride, carbide ceramics such as silicon carbide, zirconium carbide, titanium carbide, tantalum carbide and tungsten carbide, and oxide ceramics such as alumina, zirconia, cordierite mullite and silica. Moreover, the lamination members mainly made from porous ceramics may be made from two or more kinds of materials, such as a composite of silicon and silicon carbide, and aluminum titanate.

With respect to the particle size of ceramic particles to be used upon manufacturing the lamination members, although not particularly limited, those which are less likely to shrink in the succeeding firing process are preferably used, and for example, those particles, prepared by combining 100 parts by weight of ceramic powder having an average particle size from 0.3 to 50 μm with 5 to 65 parts by weight of ceramic powder having an average particle size from 0.1 to 1.0 μm, are preferably used. By mixing ceramic powders having the above-mentioned respective particle sizes at the above-mentioned blending ratio, it is possible to manufacture the lamination members made from porous ceramics.

With respect to the porosity of the lamination members mainly made from porous ceramics, although not particularly limited, a preferable lower limit value is set to 50% by volume and a preferable upper limit value is set to 80% by volume.

The porosity of less than 50% by volume fails to collect particulates in the inner side of the wall portion; thus, the pressure loss tends to rise abruptly upon collection of particulates; in contrast, the porosity exceeding 80% by volume causes degradation in the strength of the lamination members mainly made from porous ceramics; thus, it might be easily broken.

Moreover, with respect to the average pore diameter of the lamination members mainly made from porous ceramics, although not particularly limited, a preferable lower limit value is set to 1 μm, and a preferable upper limit value is set to 100 μm. The average particle size of less than 1 μm tends to cause clogging in the inner side of the wall portion and fail to carry out the deep-layer filtering process therein. In contrast, the average particle size exceeding 100 μm makes particulates easily pass through the pores to cause degradation in the particulate-collecting efficiency.

In the honeycomb structural body of the present invention, a catalyst is preferably supported on the lamination members 10*a*.

When such a catalyst for purifying toxic gas components, such as CO, HC and NOx in exhaust gases, is supported thereon, the honeycomb structural body of the present invention is allowed to sufficiently purify the toxic gas components in the exhaust gases through a catalytic reaction so that reaction heat, generated through the above-mentioned catalytic reaction, can be utilized for burning and removing particulates adhered to the wall portion 23. Moreover, when a catalyst used for reducing activating energy of burning particulates is supported thereon, it becomes possible to burn and remove the particulates more easily.

With respect to the catalyst to be supported on the honeycomb filter of the present invention, although not particularly limited, those catalysts which can reduce activating energy of burning particulates, and purify toxic gas components, such as CO, HC and NOx, in exhaust gases, are preferably used, and examples thereof include noble metals, such as platinum, palladium and rhodium, $CeO_2$ and oxides having a perovskite structure ($LaCoO_3$, $LaMnO_3$, etc.). Moreover, an element, such as an alkali metal (Group 1 in Element Periodic Table), an alkali earth metal (Group 2 in Element Periodic Table), a rare-earth element (Group 3 in Element Periodic Table) and a transition metal element, may be supported thereon.

The above-mentioned catalyst may be supported on all the lamination members, or may be supported on only some of the lamination members. For example, in the case where the porosity of the respective lamination members is changed in accordance with the properties of the lamination members, the catalyst may be supported on only the lamination members that are allowed to have high porosity. In this manner, the honeycomb structural body of the present invention may be freely modified in the amount of deposition of the catalyst in the length direction as well as in the kind of the catalyst, in accordance with the application, so that the regenerating process and the purifying function for toxic gases can be improved.

The above-mentioned catalyst may be supported on the surface of each pore inside the wall portion 23, or may be supported on the wall portion 23 with a certain thickness. Moreover, the catalyst may be supported on the surface of the wall portion 23 and/or the surface of each pore uniformly, or may be supported on a certain fixed position in a biased manner. In particular, the catalyst is desirably supported on the surface of the wall portion 23 inside the bottom hole 21 having an opening on the inlet side or on the surface of each pore in the vicinity of the surface, and is more desirably supported on both of these portions. With these arrangements, the catalyst and the particulates are made in contact with each other more easily, making it possible to carry out exhaust gas purifying processes more efficiently.

Moreover, when the catalyst of noble metal or the like is applied to the honeycomb structural body of the present invention, it is preferable to apply the catalyst after the surface has been preliminarily coated with a support material such as alumina. This arrangement makes the specific surface area greater to enhance the dispersion degree of the catalyst and increase the reactive portions of the catalyst. Moreover, since the support material prevents the catalyst metal from sintering, the heat resistance of the catalyst is improved.

When such a catalyst is supported thereon, the honeycomb structural body of the present invention is allowed to function as a filter capable of collecting particulates in exhaust gases, and also to function as a catalyst-supporting member for purifying CO, HC, NOx and the like contained in exhaust gases.

Here, the honeycomb structural body of the present invention in which the catalyst is supported is allowed to function as a gas purifying device in the same manner as the conventionally known DPFs (Diesel Particulate Filters) with catalyst. Therefore, the detailed explanation of the functions as the catalyst-supporting member of the honeycomb structural body of the present invention is omitted.

With respect to the porosity of the honeycomb structural body as a whole of the present invention, although not particularly limited, a preferable lower limit value is set to 50% by volume and a preferable upper limit value is set to 98% by volume and more preferably, the lower limit value is set to 60% by weight and the upper limit value is set to 95% by weight. Most preferably, the lower limit value is set to 80% by volume.

With respect to the thickness of the wall portion, a preferable lower limit value is set to 0.2 mm and a preferable upper limit value is set to 10.0 mm; more preferably, the lower limit value is set to 0.3 mm and the upper limit value is set to 6.0 mm.

With respect to the density of through holes on a cross section perpendicular to the length direction of the honeycomb structural body, although not particularly limited, a preferable lower limit value is set to 0.16 piece/$cm^2$ (1.0 piece/$in^2$) and a preferable upper limit value is set to 62 pcs/$cm^2$ (400 pcs/$in^2$); more preferably, the lower limit value is set to 0.62 piece/$cm^2$ (4.0 pcs/$in^2$) and the upper limit value is set to 31 pcs/$cm^2$ (200 pcs/$in^2$).

Here, with respect to the size of the through hole on a cross section perpendicular to the length direction of the honeycomb structural body, although not particularly limited, a preferable lower limit value is set to 1.4 mm×1.4 mm, and a preferable upper limit value is set to 16 mm×16 mm.

Moreover, lamination members with holes having different sizes are prepared, and when these members are laminated successively, irregularities are formed on the inner surface of each through hole so that the through hole having a larger surface area is formed. Therefore, the filtering area is increased and it is possible to reduce a pressure loss upon collecting particulates. Moreover, the irregularities allow the exhaust gas flow to form a turbulent flow so that the catalyst is effectively made in contact with toxic gas components and particulates in the exhaust gases; thus, it becomes possible to improve the purifying performance of exhaust gases and the purifying rate for particulates upon regenerating process. Moreover, by forming the exhaust gas flow into a turbulent flow, it becomes possible to reduce a temperature difference in the filter, and consequently to effectively prevent damages due to thermal stress. With respect to the shape of the hole, not particularly limited to a quadrangular shape, for example, any desired shapes, such as a triangle, a hexagon, an octagon, a dodecagon, a round shape and an elliptical shape, may be used.

A honeycomb structural body 10, shown in FIG. 1, has a cylindrical shape; however, not particularly limited to the cylindrical shape, the honeycomb structural body of the present invention may have any desired pillar shape, such as an elliptical cylindrical shape and a rectangular pillar shape, with any desired size.

Moreover, in the case where the filter is installed right under the engine, the filter space is extremely limited, and a complex filter shape is required. However, in the case of the honeycomb structural body of the present invention, even a complex shape, such as a filter 30 with a concave portion on one side as shown in FIG. 6(a) and a filter 40 with concave portions on both sides as shown in FIG. 6(b), can be easily formed by superposing lamination members 30a or 40a in the length direction. Moreover, since the honeycomb structural body of the present invention is formed by laminating the lamination members in the length direction, even a curved shape in the length direction and a deformed shape that is gradually changed in the length direction can be easily formed.

Referring to FIG. 2, the following description will discuss a sequence of processes of one example of the manufacturing method for the honeycomb structural body of the present invention.

(1) Manufacturing Method for Lamination Members Mainly Made of Metal

First, a porous metal plate having a thickness of 0.1 to 20 mm, mainly made of metal, is machined by laser so that holes are formed on the almost entire surface with almost the same intervals from each other; thus, a lamination member 10a having a honeycomb shape with through holes in high density is formed.

Moreover, in the case where a lamination member, which is placed near an end face of the honeycomb structural body of the present invention so as to form a sealing portion with bottomed holes, is manufactured, upon laser machining process, a honeycomb-shape lamination member 10b in which the holes are formed in a staggered pattern with through holes formed in a lower density is manufactured.

In other words, by using several sheets of these lamination members 10b to form an end portion, it is possible to prepare a honeycomb structural body capable of functioning as a filter without the necessity of sealing predetermined through holes at the end portion.

Next, an alumina film having a large specific surface area is formed on the surface of the above-mentioned lamination member 10a or 10b, and a catalyst such as platinum is applied to the surface of this alumina film. This process is of course unnecessary when a lamination member mainly made of metal having no catalyst deposited thereon is manufactured.

With respect to the method for forming the alumina film on the surface of the lamination member 10a or 10b, for example, a method in which the lamination member 10a or 10b is impregnated with a solution of a metal compound containing aluminum such as $Al(NO_3)_3$, and heated, and a method in which the lamination member 10a or 10b is impregnated with a solution containing alumina powder, and heated, are proposed.

With respect to the method for applying a co-catalyst or the like to the alumina film, for example, a method in which the lamination member 10a or 10b is impregnated with a solution of a metal compound containing a rare-earth element such as $Ce(NO_3)_3$, and heated is proposed.

With respect to the method for applying a catalyst to the alumina film, for example, a method in which the lamination member 10a or 10b is impregnated with a solution of dinitrodiammine platinum nitrate ($[Pt(NH_3)_2(NO_2)_2]HNO_3$), and heated is proposed.

As described above, the honeycomb structural body of the present invention is preferably made of only a lamination member mainly made of metal, however in addition to this, a lamination member mainly made from inorganic fibers, a lamination member mainly made from ceramics and the like may be included therein.

(2) Manufacturing Method for Lamination Members Mainly Made from Inorganic Fibers First, preferably, a catalyst made from noble metal such as platinum is preliminarily applied to inorganic fibers such as alumina fibers that form a constituent material. By applying the catalyst to the inorganic fibers before the forming process, it is possible to apply the catalyst in a more uniformly dispersed state. This process is of course unnecessary when a lamination member mainly made from inorganic fibers having no catalyst deposited thereon is manufactured.

With respect to the method for applying the catalyst to the inorganic fibers, for example, a method in which inorganic fibers have been impregnated in a slurry of an oxide on which a catalyst is supported, the fibers are taken out and heated, and a method in which after inorganic fibers have been impregnated with a slurry containing a catalyst, the fibers are taken out and heated, are proposed. In the latter method, the catalyst is directly adhered to the inorganic fibers.

Here, with respect to the amount of deposition of the catalyst, a preferable lower limit value is set to 0.01 g/10 g of inorganic fibers, and a preferable upper limit value is set to 1 g/10 g of inorganic fibers.

In this manner, in the case of lamination members mainly made from inorganic fibers, since the catalyst is directly applied to the inorganic fibers that are a constituent material prior to the forming process, it is possible to apply the catalyst in a more uniformly dispersed state. Here, the application of the catalyst may be carried out after a paper-making process, which will be described later.

Next, a slurry for paper-making is prepared.

More specifically, the inorganic fibers bearing the catalyst, obtained through the above-mentioned method, were dispersed in water (1 L) at a rate of 5 to 100 g, and in addition to these, 10 to 40 parts by weight of an inorganic binder such as silica sol and 1 to 10 parts by weight of an organic binder were added to 100 parts by weight of the inorganic fibers, and to this were further added a slight amount of a coagulation agent such as aluminum sulfate and an aggregation agent such as polyacrylic amide, if necessary, and sufficiently stirred to prepare a slurry for paper-making.

With respect to the above-mentioned organic binder, not particularly limited, for example, acrylic latex, methylcellulose, carboxymethylcellulose, hydroxyethylcellulose, polyethylene glycol, phenol resin, epoxy resin, polyvinyl alcohol and styrene-butadiene rubber may be used.

Next, lamination members mainly made from inorganic fibers are subjected to a paper-making process by using the slurry for paper-making.

More specifically, the slurry for paper-making was subjected to a paper-making process by using a perforated mesh in which holes having a predetermined shape were formed with mutually predetermined intervals, and the resulting matter was dried at a temperature in a range from 100 to 200° C. so that a honeycomb-shape lamination member 10a, which had through holes and a predetermined thickness as shown in FIG. 2(a), was obtained.

Moreover, in the case where a lamination member that is placed near an end face of the honeycomb structural body of the present invention, and forms a sealing portion with bottomed holes is manufactured, by using, for example, a mesh having holes with a predetermined shape that are formed in a staggered pattern is used so that a honeycomb-shape lamination member 10b mainly made from inorganic fibers, which has a predetermined thickness with through holes formed therein in a lower density, is prepared.

Here, through the above-mentioned paper-making process, the above-mentioned inorganic fibers are aligned almost in parallel with the main face of the lamination member, and when the lamination body has been formed, more of the inorganic fibers are aligned along the face perpendicular to the forming direction of the through holes in comparison with those aligned along the horizontal face with respect to the forming direction of the through holes. Therefore, since the honeycomb structural body of the present invention allows exhaust gases to pass through the wall portion more easily, it is possible to reduce the initial pressure loss, and also to allow particulates to pass through deeper layers inside the wall portion; consequently, it becomes possible to prevent formation of cake layers on the surface of the wall portion, and consequently to suppress an increase in the pressure loss upon collecting particulates. Moreover, since the rate of exhaust gases flowing in parallel with the aligned direction of the inorganic fibers increases, the chance of the particulates coming into contact with the catalyst adhered to the inorganic fibers increases, making it possible to easily burn the particulates.

Furthermore, as in the case of the present invention, when the lamination members are prepared as laminated layers, the above-mentioned effects are further improved.

(3) Manufacturing Method for Lamination Members Mainly Made from Ceramics

First, by using the above-mentioned material paste mainly composed of ceramics, a ceramic formed body having almost the same shape as a desired lamination member is manufactured through a molding method such as an extrusion-molding method, a press-molding method and the like.

With respect to the material paste, although not particularly limited, those which maintain the porosity of the lamination member in a range from 50 to 80% by volume after the manufacturing process are preferably used, and, for example, a material, prepared by adding a binder, a dispersant solution and the like to the above-mentioned powder made from ceramics, may be used.

With respect to the binder, not particularly limited, for example, methylcellulose, carboxy methylcellulose, hydroxy ethylcellulose, polyethylene glycol, phenolic resin, epoxy resin and the like may be used.

Normally, the amount of blend of the binder is preferably set in a range from 1 to 10 parts by weight with respect to 100 parts by weight of ceramic powder.

With respect to the dispersant solution, not particularly limited, for example, an organic solvent such as benzene, alcohol such as methanol and water may be used.

An appropriate amount of the above-mentioned dispersant solution is mixed therein so that the viscosity of the material paste is set within a fixed range.

These ceramic powder, binder and dispersant solution are mixed by an attritor or the like, and sufficiently kneaded by a kneader or the like, and then molded.

Moreover, a molding auxiliary may be added to the material paste, if necessary.

With respect to the molding auxiliary, not particularly limited, examples thereof include: ethylene glycol, dextrin, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass microballoons, shirasuballoons, fly ash balloons (FA balloons) and mullite balloons may be used. Among these, fly ash balloons are more preferably used.

Next, after the above-mentioned ceramic formed body has been dried by using a drier such as a microwave drier, a hot-air drier, a dielectric drier, a reduced-pressure drier, a vacuum drier and a frozen drier, the resulting ceramic dried body is subjected to degreasing and firing processes under predetermined conditions.

Here, with respect to the degreasing and firing conditions and the like of the ceramic dried body, it is possible to apply conditions that have been conventionally used for manufacturing a filter made from porous ceramics.

Next, in the same manner as the lamination member mainly made of metal, an alumina film having a large specific surface area is formed on the surface of the ceramic fired body obtained through a firing process, and a catalyst such as platinum is applied to the surface of this alumina film. This process is of course unnecessary when a lamination member mainly made from ceramics having no catalyst deposited thereon is manufactured.

(4) Laminating Process of Lamination Members

By using a cylindrical casing 23 (metal container) having a pressing member on one side as shown in FIG. 2(b), several lamination members for end-use 10b, manufactured through processes (1) to (3), are laminated inside the casing 23, and a predetermined number of the inside-use lamination members 10a are then laminated therein. Then, several lamination members for end-use 10b are lastly laminated thereon, and after having been pressed, another pressing member is also put on the other side and secured thereon so that a honeycomb structural body that has been subjected to a canning process is prepared. In this process, of course, the lamination members 10a and 10b are laminated so that the through holes are superposed on one another.

With respect to the application of the honeycomb structural body of the first and second aspects of the present invention, although not particularly limited, it is preferably used for exhaust gas purifying devices for use in vehicles.

FIG. 3 is a cross-sectional view that schematically shows one example of an exhaust gas purifying device for use in vehicles, which is provided with the honeycomb structural body of the present invention.

As shown in FIG. 3, an exhaust gas purifying device 200 is mainly constituted by a honeycomb structural body 20 of the present invention, and a casing 23 that covers the external portion of the honeycomb structural body 20; and an introducing pipe 24 that is connected to an internal combustion system such as an engine is connected to the end of the casing 23 on the side to which exhaust gases are directed, and an exhaust pipe 25 externally coupled is connected to the other end of the casing 23. Here, in FIG. 3, arrows indicate flows of exhaust gases.

In the exhaust gas purifying device 200 having the above-mentioned arrangement, exhaust gases, discharged from the internal combustion system such as an engine, are introduced into the casing 23 through the introducing pipe 24, and allowed to pass through the wall portion from the bottomed hole of the honeycomb structural body 20; thus, the exhaust gases are purified, with particulates thereof being collected in the wall portion, and are then discharged outside through the exhaust pipe 25.

After a large quantity of particulates have been accumulated on the wall portion of the honeycomb structural body 20 to cause an increase in pressure loss, the honeycomb structural body 20 is subjected to a regenerating process.

The regenerating process of the honeycomb structural body 20 means that the collected particulates are burned. With respect to the regenerating method for the honeycomb structural body of the present invention, for example, the following methods are used: a method in which the honeycomb structural body is heated by using a heating means placed on the exhaust gas inlet side, a method in which an oxidizing catalyst is deposited on the honeycomb structural body, and hydrocarbon and the like of exhaust gases are oxidized by this oxidizing catalyst to generate heat so that by utilizing this heat, the regenerating process is carried out in parallel with the exhaust gas purifying process, a method in which a catalyst, which directly oxidizes solid-state particulates, is attached to the filter, and a method in which NOx is oxidized by using an oxidizing catalyst placed on the upstream side of the honeycomb structural body to generate $NO_2$ so that particulates are oxidized by using the $NO_2$.

EXAMPLES

The following description will discuss the present invention in detail by means of examples; however, the present invention is not intended to be limited by these examples.

Example 1

(1) Manufacturing Process of Lamination Members

A three-dimensional mesh-shape porous member, made of Ni—Cr alloy (trade name: CELMET, average pore diameter: 400 μm, made by Sumitomo Electric Industries Ltd.), was compressed by a roller so as to have an average pore diameter of 80 μm, and after having been machined into a disc shape having a size of 43.8 mm in diameter×1 mm in thickness, the resulting disc is machined by laser to form holes, each having a size of 6 mm×6 mm, over the almost entire surface with mutual intervals of 2 mm; thus, a lamination member $A_1$ having a honeycomb shape was manufactured.

Moreover, in order to form end members for use in two end portions of the honeycomb structural body, a three-dimensional mesh-shape porous member, made of Ni—Cr alloy (trade name: CELMET, average pore diameter: 400 μm, made by Sumitomo Electric Industries Ltd.), was compressed by a roller so as to have an average pore diameter of 80 μm, and after having been machined into a disc shape having a size of 143.8 mm in diameter×1 mm in thickness, the resulting disc is machined by laser so that a lamination member $B_1$ in which holes, each having a size of 6 mm×6 mm, are formed in a staggered pattern was prepared.

(2) Catalyst Applying Process $Al(NO_3)_3$ was put into 1,3-butane diol, and the resulting solution was stirred at 60° C. for 5 hours to prepare a 1,3-butane diol solution containing 30% by weight of $Al(NO_3)_3$. After the lamination members $A_1$ and $B_1$ had been immersed in this 1,3-butane diol solution, these were heated at 150° C. for 2 hours, and then heated at 400° C. for 2 hours, and after having been immersed in water at 80° C. for 2 hours, these were heated at 700° C. for 8 hours so that an alumina layer was formed on the surface of each of the lamination members $A_1$ and $B_1$ at a rate of 60 g/l.

$Ce(NO_3)_3$ was charged into ethylene glycol, and the resulting solution was stirred at 90° C. for 5 hours to prepare an ethylene glycol solution containing 6% by weight of $Ce(NO_3)_3$. After the lamination members $A_1$ and $B_1$ bearing the alumina layers formed thereon had been immersed in this ethylene glycol solution, these were heated at 150° C. for 2 hours, and then heated at 650° C. for 2 hours in a nitrogen atmosphere; thus, an alumina layer containing a rare-earth oxide, used for bearing a catalyst on the surface thereof, was formed on the surface of each of the lamination members $A_1$ and $B_1$.

After the lamination members $A_1$ and $B_1$ bearing the alumina layers containing a rare-earth oxide formed thereon had been immersed in a dinitrodiammine platinum nitrate ([Pt(NH_3)_2(NO_2)_2]HNO_3) aqueous solution, these were heated at 110° C. for 2 hours, and then heated at 500° C. for 1 hour in a nitrogen atmosphere; thus, a platinum catalyst having an average particle size of 2 nm was deposited on the surface of each of the lamination members $A_1$ and $B_1$ at a rate of 5 g/l.

(3) Laminating Process

A casing (cylindrical metal container) having a pressing member on one side was placed with the side to which the pressing member was attached facing down. After five of the lamination members $B_1$ bearing the platinum catalyst deposited thereon had been laminated, 140 of the lamination members $A_1$ bearing the platinum catalyst deposited thereon were laminated, and five of the lamination members $B_1$ bearing the platinum catalyst deposited thereon were lastly laminated thereon; moreover, this was then subjected to a pressing process, and a pressing member was also placed on the other side so as to be secured so that an exhaust gas purifying device in which a honeycomb structural body having a length of 150 mm was assembled into a casing was prepared. Here, in this process, the respective lamination members were laminated so that the through holes were superposed on one another.

Example 2

A three-dimensional mesh-shape porous member, made of Ni—Cr alloy (trade name: CELMET, average pore diameter: 400 μm, made by Sumitomo Electric Industries Ltd.), was compressed by a roller so as to have an average pore diameter of 80 μm, and after having been machined into a disc shape having a size of 143.8 mm in diameter×1 mm in thickness, the resulting disc is machined by laser to manufacture a lamination member $A_2$ having a honeycomb shape with a thickness of 2 mm in the same manner as the lamination member $A_1$; then, the same processes as Example 1 were carried out except that after having applied a catalyst thereto, five of the lamination members $B_1$, 70 of the lamination members $A_2$ and five of the lamination members $B_1$ were laminated in this order so that an exhaust gas purifying device in which a honeycomb structural body having a length of 150 mm was assembled into a casing was prepared.

Example 3

A three-dimensional mesh-shape porous member, made of Ni—Cr alloy (trade name: CELMET, average pore diameter: 400 μm, made by Sumitomo Electric Industries Ltd.), was compressed by a roller so as to have an average pore diameter of 80 μm, and after having been machined into a disc shape having a size of 143.8 mm in diameter×4 mm in thickness, the resulting disc is machined by laser to manufacture a lamination member $A_3$ having a honeycomb shape with a thickness of 4 mm in the same manner as the lamination member $A_1$; then, the same processes as Example 1 were carried out except that after having applied a catalyst thereto, five of the lamination members $B_1$, 35 of the lamination members $A_3$ and five of the lamination members $B_1$ were laminated in this order so that an exhaust gas purifying device in which a honeycomb structural body having a length of 150 mm was assembled into a casing was prepared.

Example 4

The same processes as those of Example 1 were carried out to produce 70 lamination members $A_1$, and 70 lamination members $A_4$ that were the same as the lamination members $A_1$ except that the size of the holes was set to 4 mm×4 mm with mutual intervals between the holes being set to 4 mm were produced; then, the same processes as Example 1 were carried out except that after having applied a catalyst thereto, five of the lamination members $B_1$, 140 members, formed by alternately placing the lamination members $A_1$ and the lamination members $A_4$, and five of the lamination members $B_1$ were laminated in this order so that an exhaust gas purifying device in which a honeycomb structural body having a length of 150 mm was assembled into a casing was prepared.

Example 5

(1) Catalyst Applying Process to Inorganic Fibers

Alumina fibers (average fiber diameter: 5 μm, average fiber length: 0.3 mm) were impregnated with an alumina slurry bearing Pt (Pt concentration: 5% by weight) for two minutes, and then heated at 500° C. to prepare alumina fibers to which the catalyst is adhered. The amount of deposition of Pt was 0.24 g/10 g of alumina.

(2) Preparation Process for Slurry for Paper-making

Next, the alumina fibers obtained from the process (1) were dispersed in water (1 L) at a rate of 10 g, and in addition to these, 5% by weight of silica sol serving as an inorganic binder and 3% by weight of an acrylic latex serving as an organic binder were added to the fibers. Further, a slight amount of aluminum sulfate serving as a coagulation agent and polyacrylic amide serving as an aggregation agent were further added thereto, and the mixture was sufficiently stirred to prepare a slurry for paper-making.

(3) Paper-making Process

The slurry for paper-making, obtained in the process (2), was subjected to a paper-making process by using a perforated mesh having a diameter of 143.8 mm in which holes having a size of 6 mm×6 mm were formed over the entire surface with mutual intervals of 2 mm, and the resulting matter was dried at a temperature of 150° C. so that a lamination member $A_5$ having a size of 143.8 mm in diameter×1 mm in thickness with holes of 6 mm×6 mm being formed on the almost entire surface with mutual intervals of 2 mm was prepared.

(4) Laminating Process

A casing (cylindrical metal container) having a pressing member on one side was placed with the side to which the pressing member was attached facing down. After five of the lamination members $B_1$ manufactured in the same manner as Example 1 had been laminated, 150 sheets of the lamination members $A_5$ were laminated, and five of the lamination members $B_1$ manufactured in the same manner as Example 1 were lastly laminated therein, and this was further subjected to a pressing process, and another pressing member was also put on the other side so as to be secured so that an exhaust gas purifying device in which a honeycomb structural body having a length of 150 mm was assembled into a casing was prepared. The amount of Pt deposition of this honeycomb structural body was 5 g/l. Here, in this process, the respective lamination members were laminated so that the through holes were superposed on one another.

Example 6

The same processes as those of Example 2 were carried out except that after having produced a lamination member $A_6$ having the same composition and the same shape as the lamination member $A_5$ with a thickness of 5 mm, five of the lamination members $B_1$, 30 of the lamination members $A_6$ and five of the lamination members $B_1$ were laminated in this order so that an exhaust gas purifying device in which a honeycomb structural body having a length of 150 mm was assembled into a casing was prepared.

Example 7

The same processes as those of Example 3 were carried out except that after having produced a lamination member $A_7$ having the same composition and the same shape as the lamination member $A_5$ with a thickness of 10 mm, five of the lamination members $B_1$, 15 of the lamination members $A_7$ and five of the lamination members $B_1$ were laminated in this order so that an exhaust gas purifying device in which a honeycomb structural body having a length of 150 mm was assembled into a casing was prepared.

Example 8

The same processes as those of Example 5 were carried out to produce 75 lamination members $A_5$, and 75 lamination members $A_8$ that were the same as the lamination members $A_5$ except that the size of the holes was set to 4 mm×4 mm with mutual intervals between the holes being set to 4 mm were produced; then, the same processes as Example 5 were carried out except that after having applied a catalyst thereto, five of the lamination members $B_1$, 150 members, formed by alternately placing the lamination members $A_5$ and the lamination members $A_8$, and five of the lamination members $B_1$ were laminated in this order so that an exhaust gas purifying device in which a honeycomb structural body having a length of 150 mm was assembled into a casing was prepared.

Example 9

(1) Manufacturing Process of Lamination Members

A metal fiber porous member, made of Ni—Cr—Mo based stainless (SUS316L: trade name: NASLON, made by Nippon Seisen Co., Ltd.), was machined into a disc shape having a size of 143.8 mm in diameter×1 mm in thickness, and the resulting disc is machined by laser to form holes, each having a size of 6 mm×6 mm, over the almost entire surface with mutual intervals of 2 mm; thus, a lamination member $A_9$ having a honeycomb shape was manufactured.

Moreover, in order to form members for use in two end portions of the honeycomb structural body, a metal fiber porous member, made of Ni—Cr—Mo based stainless (SUS316L: trade name: NASLON, made by Nippon Seisen Co., Ltd.), was machined into a disc shape having a size of 143.8 mm in diameter×1 mm in thickness, and the resulting disc is machined by laser so that a lamination member $B_2$ having holes, each having a size of 6 mm×6 mm, in a staggered pattern.

(2) Catalyst Applying Process

The same processes as Example 1 were carried out so that an alumina layer containing a rare-earth oxide was formed on each of the lamination members $A_9$ and $B_2$ with 5 g/l of platinum catalyst having an average particle size of 2 nm being deposited thereon.

(3) Laminating Process

A casing (cylindrical metal container) having a pressing member on one side was placed with the side to which the pressing member was attached facing down. After five of the lamination members $B_2$ bearing the platinum catalyst deposited thereon had been laminated, 140 of the lamination members $A_9$ bearing the platinum catalyst deposited thereon were laminated, and five of the lamination members $B_2$ bearing the platinum catalyst deposited thereon were lastly laminated therein, and this was further subjected to a pressing process, and another pressing member was also put on the other side so as to be secured so that an exhaust gas purifying device in which a honeycomb structural body having a length of 150 mm was assembled into a casing was prepared. In this process, the lamination members were laminated so that the through holes are superposed on one another. Here, in this process, the respective lamination members were laminated so that the through holes were superposed on one another.

Example 10

The same processes as those of Example 1 were carried out to produce 140 lamination members $A_1$, and the same processes as those of Example 9 were carried out to produce ten lamination members $B_2$; then, the same processes as Example 1 were carried out except that after having applied a catalyst thereto, five of the lamination members $B_2$, 140 of the lamination members $A_1$ and five of the lamination members $B_2$ were laminated in this order so that an exhaust gas purifying device in which a honeycomb structural body having a length of 150 mm was assembled into a casing was prepared.

Example 11

(1) Catalyst Applying Process to Inorganic Fibers

Alumina fibers (average fiber diameter: 5 μm, average fiber length: 0.3 mm) were impregnated with an alumina slurry bearing Pt (Pt concentration: 5% by weight) for two minutes, and then heated at 500° C. to prepare alumina fibers to which the catalyst is adhered. The amount of deposition of Pt was 0.24 g/10 g of alumina.

(2) Preparation Process for a Slurry for Paper-making

Next, the alumina fibers obtained from the process (1) were dispersed in water (1 L) at a rate of 10 g, and in addition to these, 5% by weight of silica sol serving as an inorganic binder and 3% by weight of an acrylic latex serving as an organic binder were added to the fibers. Further, a slight amount of aluminum sulfate serving as a coagulation agent and polyacrylic amide serving as an aggregation agent were further added thereto, and the mixture was sufficiently stirred to prepare a slurry for paper-making.

(3) Paper-making Process

The slurry, obtained in the process (2), was subjected to a paper-making process by using a perforated mesh having a diameter of 143.8 mm in which holes having a size of 6 mm×6 mm were formed over the entire surface with mutual intervals of 2 mm, and the resulting matter was dried at a temperature of 150° C. so that a lamination member $A_{10}$ having a thickness of 1 mm with holes of 6 mm×6 mm being formed on the entire surface with mutual intervals of 2 mm was prepared.

Moreover, in order to form members for use in two end portions of the honeycomb structural body, the paper-making and drying processes were carried out in the same manner by using a mesh in which holes having a size of 6 mm×6 mm were formed in a staggered pattern so that a lamination member $B_3$ having a thickness of 1 mm with holes of 6 mm×6 mm being formed in the staggered pattern was prepared.

(4) Laminating Process

A casing (cylindrical metal container) having a pressing member on one side was placed with the side to which the pressing member was attached facing down. After five of the lamination members $B_3$ had been laminated, 140 of the lamination members $A_{10}$ were laminated, and five of the lamination members $B_3$ were lastly laminated therein, and this was further subjected to a pressing process, and another pressing member was also put on the other side so as to be secured so that a honeycomb structural body having a length of 150 mm, made of a laminated body, was prepared. The amount of Pt deposition of this honeycomb structural body was 5 g/l.

Here, in this process, the respective lamination members were laminated so that the through holes were superposed on one another.

Example 12

(1) Preparation Process for a Slurry for Paper-making

Alumina fibers (average fiber diameter: 5 μm, average fiber length: 0.3 mm) were dispersed in water (1 L) at a rate of 10 g, and in addition to these, 5% by weight of silica sol serving as an inorganic binder and 3% by weight of an acrylic latex serving as an organic binder were added to the fibers. Further, a slight amount of aluminum sulfate serving as a coagulation agent and polyacrylic amide serving as an aggregation agent were further added thereto, and the mixture was sufficiently stirred to prepare a slurry for paper-making.

(2) Paper-making Process

The slurry for paper-making, obtained in the process (1), was subjected to a paper-making process by using a perforated mesh having a diameter of 143.8 mm in which holes having a size of 6 mm×6 mm were formed over the entire surface with mutual intervals of 2 mm, and the resulting matter was dried at a temperature of 150° C. so that a lamination member $A_{11}$ having a size of 143.8 mm in diameter×1 mm in thickness with holes of 6 mm×6 mm being formed on the almost entire surface with mutual intervals of 2 mm was prepared. Moreover, in order to obtain sheets for use in two end portions of the honeycomb structural body, the paper-making and drying processes were carried out in the same manner by using a mesh in which holes having a size of 6 mm×6 mm were formed in a staggered pattern so that a lamination member $B_4$ having a thickness of 1 mm with holes of 6 mm×6 mm being formed in the staggered pattern was prepared.

(3) Catalyst Applying Process

Next, 0.01 mole of $La(NO_3)_3 \cdot 6H_2O$, 0.01 mole of $Co(OCOCH_3)_2 \cdot 4H_2O$ and 0.024 mole of $C_6H_8O_7 \cdot H_2O$(citric acid) were mixed and stirred in 20 ml of an ethanol solvent to prepare $LaCoO_3$ precursor sol. The lamination members $A_{11}$ and $B_4$ were impregnated with this precursor sol, and after having been taken out, extra sol was removed by a suction process, and the resulting matter was dried at 100° C., and fired at 600° C. for one hour so that a lamination member $A_{12}$ and a lamination member $B_5$ were obtained. Here, the perovskite structure of $LaCoO_3$ was confirmed through X-ray diffraction measurements. The amount of deposition of the catalyst was 30 g/l.

(4) Laminating Process

A casing (cylindrical metal container) having a pressing member on one side was placed with the side to which the pressing member was attached facing down. After five of the lamination members $B_5$ had been laminated, 140 of the lamination members $A_{12}$ were laminated, and five of the lamination members $B_5$ were lastly laminated thereon; moreover, this was then subjected to a pressing process, and a pressing member was also placed on the other side so as to be secured so that a honeycomb structural body made of a laminated body having a length of 150 mm was prepared.

Here, in this process, the respective lamination members were laminated so that the through holes were superposed on one another.

Example 13

(1) Catalyst Applying Process

Further, 0.01 mole of $La(NO_3)_3 \cdot 6H_2O$, 0.01 mole of $Co(OCOCH_3)_2 \cdot 4H_2O$ and 0.024 mole of $C_6H_8O_7 \cdot H_2O$(citric acid) were mixed and stirred in 20 ml of an ethanol solvent to prepare $LaCoO_3$ precursor sol. The lamination members $A_1$ and $B_1$ were impregnated with this precursor sol, and after having been taken out, extra sol was removed by a suction process, and the resulting matter was dried at 100° C., and fired at 600° C. for one hour so that a lamination member $A_{13}$ and a lamination member $B_6$ were obtained. Here, the perovskite structure of $LaCoO_3$ was confirmed through X-ray diffraction measurements. The amount of deposition of the catalyst was 30 g/l.

(2) Laminating Process

A casing (cylindrical metal container) having a pressing member on one side was placed with the side to which the pressing member was attached facing down. After five of the lamination members $B_6$ had been laminated, 140 of the lamination members $A_{13}$ were laminated, and five of the lamination members $B_6$ were lastly laminated thereon; moreover, this was then subjected to a pressing process, and a pressing member was also placed on the other side so as to be secured so that a honeycomb structural body made of a laminated body having a length of 150 mm was prepared.

Here, in this process, the respective lamination members were laminated so that the through holes were superposed on one another.

Example 14

(1) Catalyst Applying Process

Moreover, 0.01 mole of $La(NO_3)_3 \cdot 6H_2O$, 0.01 mole of $Co(OCOCH_3)_2 \cdot 4H_2O$ and 0.024 mole of $C_6H_8O_7 \cdot H_2O$(citric acid) were mixed and stirred in 20 ml of an ethanol solvent to prepare $LaCoO_3$ precursor sol. The lamination members $A_9$ and $B_2$ were impregnated with this precursor sol, and after having been taken out, extra sol was removed by a suction process, and the resulting matter was dried at 100° C., and fired at 600° C. for one hour so that a lamination member $A_{14}$ and a lamination member $B_7$ were obtained. Here, the perovskite structure of $LaCoO_3$ was confirmed through X-ray diffraction measurements. The amount of deposition of the catalyst was 30 g/l.

(2) Laminating Process

A casing (cylindrical metal container) having a pressing member on one side was placed with the side to which the pressing member was attached facing down. After five of the lamination members $B_7$ had been laminated, 140 of the lamination members $A_{14}$ were laminated, and five of the lamination members $B_7$ were lastly laminated thereon; moreover, this was then subjected to a pressing process, and a pressing member was also placed on the other side so as to be secured so that a honeycomb structural body made of a laminated body having a length of 150 mm was prepared.

Here, in this process, the respective lamination members were laminated so that the through holes were superposed on one another.

Comparative Example 1

(1) Powder of α-type silicon carbide having an average particle size of 10 μm (80% by weight) and powder of β-type silicon carbide having an average particle size of 0.5 μm (20% by weight) were wet-mixed, and to 100 parts by weight of the resulting mixture were added and kneaded 5 parts by weight of an organic binder (methyl cellulose) and 10 parts by weight of water to obtain a kneaded matter. Next, after a slight amount of a plasticizer and a lubricant had been further added and kneaded therein, the resulting mixture was extrusion-molded so that a raw molded product was formed.

Next, the above-mentioned raw molded product was dried by using a micro-wave drier, and after predetermined through holes had been filled with a paste having the same composition as the raw molded product, the resulting product was again dried by using a drier. Thereafter, this was then degreased at 400° C., and fired at 2200° C. in a normal-pressure argon atmosphere for 3 hours to manufacture a porous ceramic member, which was a silicon carbide sintered body, and had a size of 33 mm×33 mm×150 mm, the number of through holes of 3.1 pcs/cm² and a thickness of the through holes of 2 mm.

By using a heat resistant adhesive paste containing 19.6% by weight of alumina fibers having a fiber length of 0.2 mm, 67.8% by weight of silicon carbide particles having an average particle size of 0.6 μm, 10.1% by weight of silica sol and 2.5% by weight of carboxymethyl cellulose, a large number of the porous ceramic members were combined with one another, and this was then cut by using a diamond cutter to form a cylindrical ceramic block having a diameter of 141.8 mm.

Next, ceramic fibers made from alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 1.0 mm was formed on the circumferential portion of the ceramic block by using the above-mentioned sealing material paste. Further, this sealing material paste layer was dried at 120° C. so that a cylindrical honeycomb structural body was manufactured. Then, Pt was adhered to this honeycomb structural body at a rate of 5 g/l by using a conventional method (in which the honeycomb structural body was immersed in alumina slurry bearing Pt).

Next, a casing (cylindrical metal container) having a pressing member on one side was placed with the side to which the pressing member was attached facing down. After the honeycomb structural body bearing the platinum catalyst deposited thereon had been assembled in the casing with a holding sealant member wound thereon, another pressing member was also put on the other side so as to be secured so that an exhaust gas purifying device in which the honeycomb structural body having a length of 150 mm was assembled into a casing was prepared.

Comparative Example 2

As shown in FIG. 7(a) a three-dimensional mesh-shape porous member, made of Ni—Cr alloy (trade name: CEL-MET, average pore diameter: 400 μm, made by Sumitomo Electric Industries Ltd.), was compressed by a roller so as to have an average pore diameter of 80 μm, and formed into a sheet having a thickness of 2 mm; and then, tubular filters 81 and 82, formed by winding these sheets eight times, are combined with each other in a concentric manner, and iron plates 84 are attached to two end faces with gaskets interposed therebetween in staggered fashion on the gas inlet side and the gas outlet side so that a filter element 80 was manufactured. By assembling seven sets of these filter elements 80 in a casing (a cylindrical metal container) with equal intervals so that an exhaust gas purifying device was formed. Here, FIG. 7(b) is a cross-sectional view that schematically shows a cross section in parallel with the length direction of the filter element 80 shown in FIG. 7(a). As indicated by arrows shown in FIG. 7(b), gases are directed between the tubular filters 81 and 82, and allowed to pass through the respective filters and flow outside of the tubular filter 81 or inside of the tubular filter 82.

Comparative Example 3

First, two sheets of belt-shaped flat-plate stainless foil 97 and corrugated stainless foil 98 are wound to form multiple layers in which these foils are located alternately, and the contact portions of the flat-plate stainless foil 97 and the corrugated stainless foil 98 are brazed to each other so that a honeycomb structural body 90 having a roll shape as a whole, as shown in FIG. 8, was formed (corrugating process). Further, a catalyst substance, prepared by mixing porous silica powder, inorganic fibers (reinforcing material), inorganic binding agent, water and organic binding agent, was applied to the outer surface of a cell wall 91 forming the honeycomb structural body 90. The catalyst substance was left at normal temperature, and almost dried, and this was then heated at 500 to 600° C. for 40 minutes so that a honeycomb structural body 90 bearing the catalyst deposited therein was manufactured. In this honeycomb structural body 90, exhaust gases are allowed to pass through a number of hollow columnar cells 92 that are formed as separated sections by the cell walls 91.

Next, a casing (cylindrical metal container) having a pressing member on one side was placed with the side to which the pressing member was attached facing down. After the honeycomb structural body bearing the catalyst deposited therein had been assembled in a casing, another pressing member was also put on the other side so as to be secured so that an exhaust gas purifying device in which the honeycomb structural body having a length of 150 mm was assembled into a casing was prepared.

Evaluation Method (1) Occurrence of Damages Due to Regenerating Process

The same exhaust gas purifying devices as those of the examples and comparative examples were manufactured except that no catalyst was deposited thereon, and each of these was placed in an exhaust passage of an engine. Then, the engine was driven at the number of revolutions of 3000 $min^{-1}$ and a torque of 50 Nm until 1 g of particulates per 100 g of the filter had been collected, and the filter was then subjected to a regenerating process to burn the particulates. Here, with respect to the honeycomb structural bodies of Examples 1 to 14, upon regenerating, temperatures inside the filter were measured at the lamination members located before and after a portion 20 mm apart from the exhaust gas inlet side as well as at the lamination members located before and after a portion 20 mm apart from the exhaust gas outlet side. Further, at each of the portions, a temperature difference occurring in the length direction per one sheet of the lamination layers was measured. Moreover, with respect to the honeycomb structural bodies or filter elements of Comparative Examples 1 to 3, temperatures were measured at a portion 20 mm apart from the exhaust gas inlet side as well as at a portion 20 mm apart from the exhaust gas outlet side. Then, a temperature difference occurring in the length direction of the honeycomb filter or the filter element was measured. Table 1 shows the results of the measurements.

Further, the above-mentioned particulate collecting process and regenerating process are respectively repeated 100 times, and each of the honeycomb structural bodies or the filter elements was cut along a face perpendicular to the length direction thereof, and the cut face was visually observed for occurrence of any damages. Table 1 shows the results.

(2) Changes in Pressure Loss upon Collection of Particulates

Each of the exhaust gas purifying devices according to the examples and comparative examples was placed in an exhaust passage of an engine, and the engine was driven at the number of revolutions of 1200 $min^{-1}$ and a torque of 10 Nm for 100 minutes so that the initial pressure loss before collecting particulates and the pressure loss after collection of 3 g/l of particulates were measured. Table 2 shows the results.

(3) Porosity of Honeycomb Structural Body or Filter Element

With respect to each of the honeycomb structural bodies or filters according to the respective examples and comparative examples, the porosity was measured by a weight porosity measuring method. Table 2 shows the results.

(4) Change in Collecting Efficiency upon Regenerating

Each of the exhaust gas purifying devices according to the respective examples and comparative examples was placed in an exhaust passage of an engine, the engine was driven at the number of revolutions of 3000 min$^{-1}$ and a torque of 50 Nm until 1 g of particulates per 100 g of the exhaust gas purifying device or the filter had been collected; thereafter, this was then subjected to a regenerating process to burn the particulates. These processes were defined as one cycle, and 51 cycles of the particulate-collecting and regenerating processes were repeated. During the tests, the amount of particulates collected by the honeycomb structural body or the filter element and the amount of particulates that were not collected were respectively measured; thus, the collecting efficiencies of particulates were confirmed respectively, at the initial state before collection of particulates, after one time of the regenerating process and after 50 times of the regenerating processes. Table 2 shows the results.

Here, the collecting efficiency of particulates refers to a ratio of particulates collected by the honeycomb structural body or the filter element to the particulates in exhaust gases that were allowed to flow into the exhaust gas purifying device.

TABLE 1

|  | Constituent material | Weight (g) | Structure | Thickness of lamination member (mm) | Temperature difference upon regenerating (° C.) | | Presence or absence of damage |
|---|---|---|---|---|---|---|---|
|  |  |  |  |  | Lamination member on inlet side | Lamination member on outlet side |  |
| Example 1 | Metal | 800 | Lamination type | 1 | 0 | 1 | Absence |
| Example 2 | Metal | 800 | Lamination type | 2 | 1 | 1 | Absence |
| Example 3 | Metal | 800 | Lamination type | 4 | 1 | 2 | Absence |
| Example 4 | Metal | 800 | Lamination type | 1 | 0 | 1 | Absence |
| Example 5 | Metal + Inorganic fiber | 500 | Lamination type | 1 | 1 | 2 | Absence |
| Example 6 | Metal + Inorganic fiber | 500 | Lamination type | 5 | 2 | 5 | Absence |
| Example 7 | Metal + Inorganic fiber | 500 | Lamination type | 10 | 15 | 25 | Absence |
| Example 8 | Metal + Inorganic fiber | 500 | Lamination type | 1 | 1 | 2 | Absence |
| Example 9 | Metal fiber | 800 | Lamination type | 1 | 0 | 1 | Absence |
| Example 10 | Metal fiber + Inorganic fiber | 500 | Lamination type | 1 | 1 | 2 | Absence |
| Example 11 | Inorganic fiber | 500 | Lamination type | 1 | 1 | 2 | Absence |
| Example 12 | Inorganic fiber | 500 | Lamination type | 1 | 1 | 2 | Absence |
| Example 13 | Metal | 500 | Lamination type | 1 | 1 | 2 | Absence |
| Example 14 | Metal fiber | 500 | Lamination type | 1 | 1 | 2 | Absence |
| Comparative Example 1 | Refractory particle | 1150 | Integral type | — | 170 | | Presence |
| Comparative Example 2 | Metal | 880 | Element type | — | 80 | | Absence |
| Comparative Example 3 | Metal | 800 | Corrugate type | — | 85 | | Absence |

TABLE 2

|  | Pressure loss (kPa) | | Porosity (% by volume) | Collecting efficiency (%) | | |
|---|---|---|---|---|---|---|
|  | Initial state | After collection of 3 g/l | | Initial state | After regenerating process of one time | After regenerating process of 50 times |
| Example 1 | 10.5 | 15.9 | 90 | 80 | 80 | 80 |
| Example 2 | 10.7 | 15.1 | 90 | 80 | 80 | 80 |
| Example 3 | 10.9 | 15.5 | 90 | 80 | 80 | 80 |
| Example 4 | 12.4 | 14.2 | 90 | 85 | 85 | 85 |
| Example 5 | 10.3 | 15.7 | 90 | 80 | 75 | 65 |
| Example 6 | 10.6 | 15.2 | 90 | 80 | 80 | 70 |
| Example 7 | 10.9 | 15.9 | 90 | 80 | 80 | 70 |
| Example 8 | 12.6 | 14.8 | 90 | 85 | 80 | 70 |
| Example 9 | 11.4 | 16.1 | 85 | 80 | 80 | 80 |
| Example 10 | 10.9 | 15.8 | 90 | 80 | 75 | 65 |
| Example 11 | 10.3 | 14.5 | 90 | 80 | 75 | 60 |
| Example 12 | 9.5 | 13.5 | 90 | 80 | 75 | 60 |
| Example 13 | 9.7 | 14.8 | 90 | 80 | 80 | 80 |
| Example 14 | 10.1 | 15.0 | 85 | 80 | 80 | 80 |
| Comparative Example 1 | 14.6 | 32.8 | 70 | 90 | 90 | 0 |

TABLE 2-continued

| | Pressure loss (kPa) | | | Collecting efficiency (%) | | |
|---|---|---|---|---|---|---|
| | Initial state | After collection of 3 g/l | Porosity (% by volume) | Initial state | After regenerating process of one time | After regenerating process of 50 times |
| Comparative Example 2 | 23.5 | 36.7 | 90 | 70 | 70 | 70 |
| Comparative Example 3 | 18.5 | 31.1 | 90 | 75 | 75 | 75 |

As clearly indicated by the results shown in Table 1, with respect to the honeycomb structural bodies according to Examples 1 to 14, a temperature difference occurring per one lamination member upon regenerating was in a range from 0 to 25° C.

In contrast, with respect to the honeycomb structural body according to Comparative Example 1, a temperature difference occurring in the honeycomb structural body upon regenerating was 170° C.

For this reason, as shown in Table 1, with respect to the honeycomb structural body according to Comparative Example 1, damages were observed after a regenerating process; in contrast, with respect to the honeycomb structural bodies according to Examples 1 to 14, no damage was observed after a regenerating process.

As clearly indicated by the results shown in Table 2, with respect to the honeycomb structural bodies according to Examples 1 to 14, the porosity was increased in comparison with the honeycomb structural body (Comparative Example 1) formed by firing ceramic particles so that it was possible to reduce the initial pressure loss and the pressure loss upon collecting particulates. In contrast, with respect to the filter element according to Comparative Example 2 and the honeycomb structural body according to Comparative Example 3, although the porosity was increased, the initial pressure loss and the pressure loss upon collecting particulates were low due to the structures thereof.

Moreover, with respect to the honeycomb structural bodies according to Examples 1 to 10, 13 and 14, since metal was used as a constituent material, the collecting efficiency was high even after repetitive regenerating processes. This is because, since the metal has a very high coefficient of thermal expansion in comparison with ceramics, the metal was expanded in the length direction as well as in the diameter direction in the honeycomb structural body at high temperatures (during use) so as to fill fine gaps between the lamination members and gaps to the casing.

Furthermore, with respect to the honeycomb structural bodies according to Examples 4 and 8, since irregularities were formed on the inner surface of each bottomed hole in the wall portion, the initial collecting efficiency was improved in these honeycomb structural bodies.

In contrast, with respect to the filter element according to Comparative Example 2 and the honeycomb structural body according to Comparative Example 3, the initial collecting efficiency was low due to the structures thereof.

BRIEF DESCRIPTION OF THE DRAWINGS

FIG. 1(a) is a perspective view that schematically shows one example of a honeycomb structural body in accordance with the invention; and FIG. 1(b) is a cross-sectional view taken along line A-A of the honeycomb structural body shown in FIG. 1(a).

FIG. 7(a) is an enlarged cross-sectional view that schematically shows a wall portion interposed between through holes in the honeycomb structural body of the present invention, and FIG. 7(b) is a cross-sectional view that schematically shows a wall portion interposed between through holes in a honeycomb structural body made from ceramics, which continuously extend in the length direction.

EXPLANATION OF SYMBOLS

Figure 2:
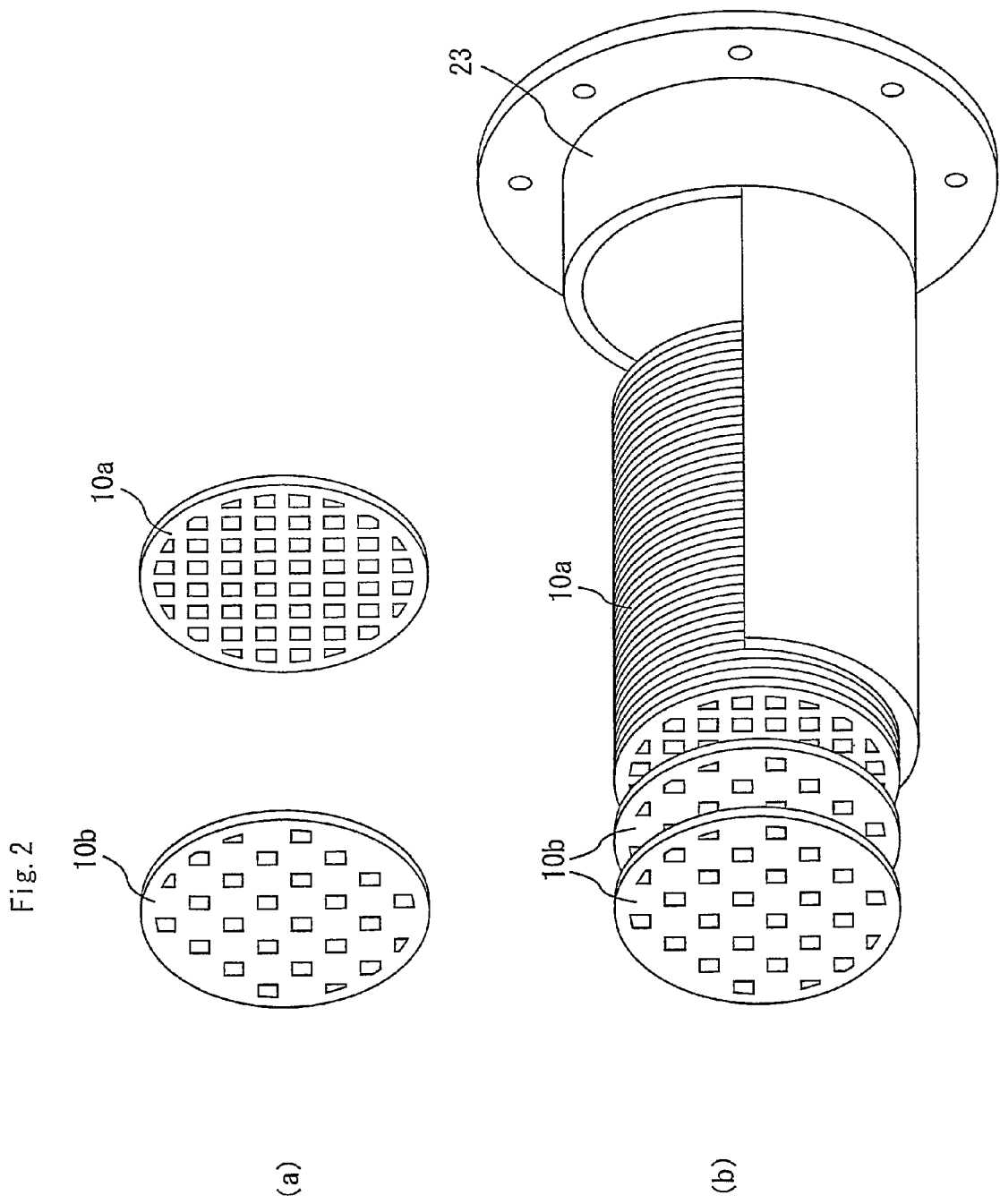
FIG. 2(a) is a perspective view that schematically shows lamination members that constitute the honeycomb structural body of the present invention.
FIG. 2(b) is a perspective view that shows a manufacturing process in which the honeycomb structural body of the present invention is formed by laminating the lamination members shown in FIG. 2(a).
Figure 3:
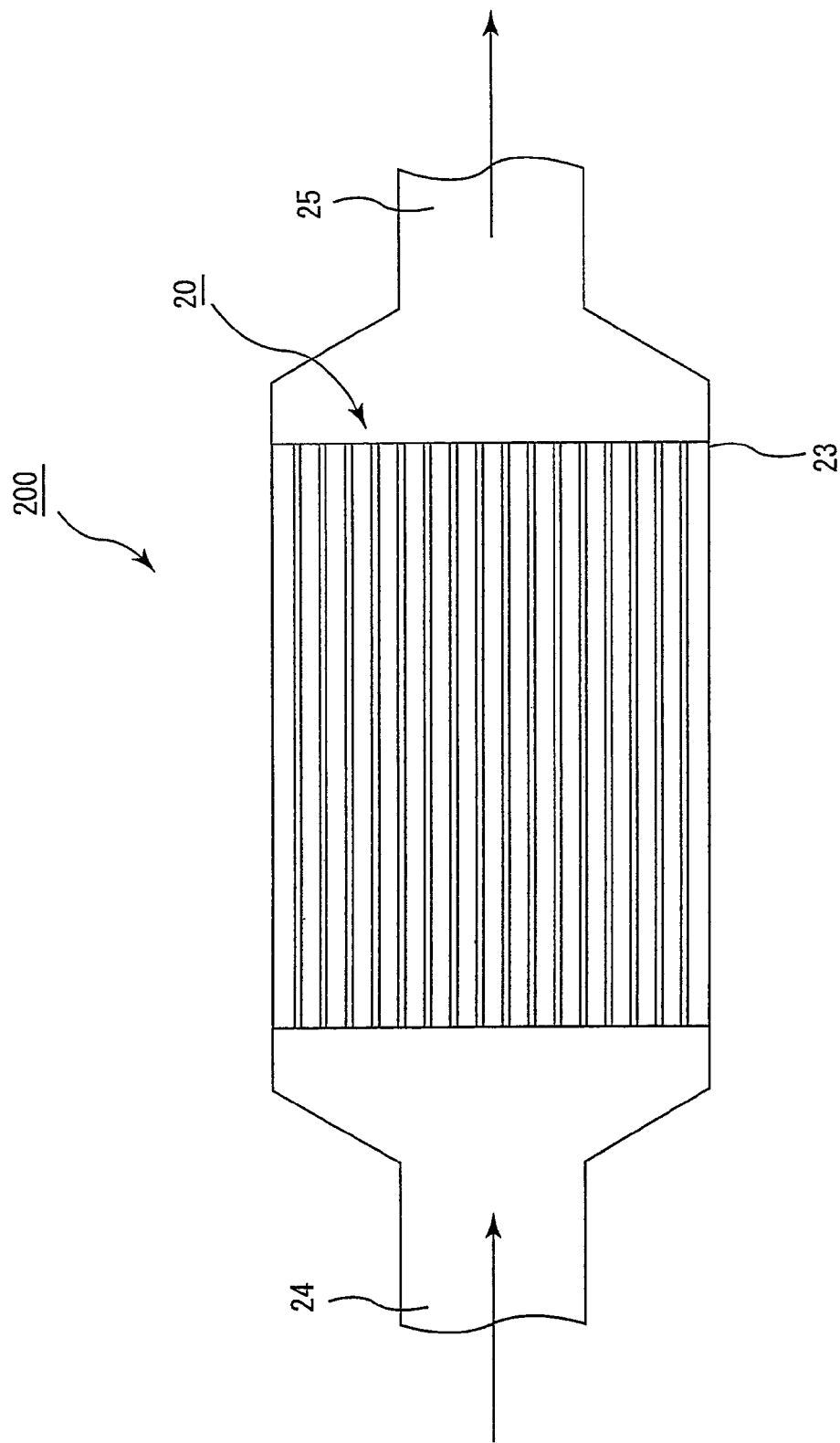
FIG. 3 is a cross-sectional view that schematically shows one example of an exhaust gas purifying device using the honeycomb structural body of the present invention.
Figure 4:
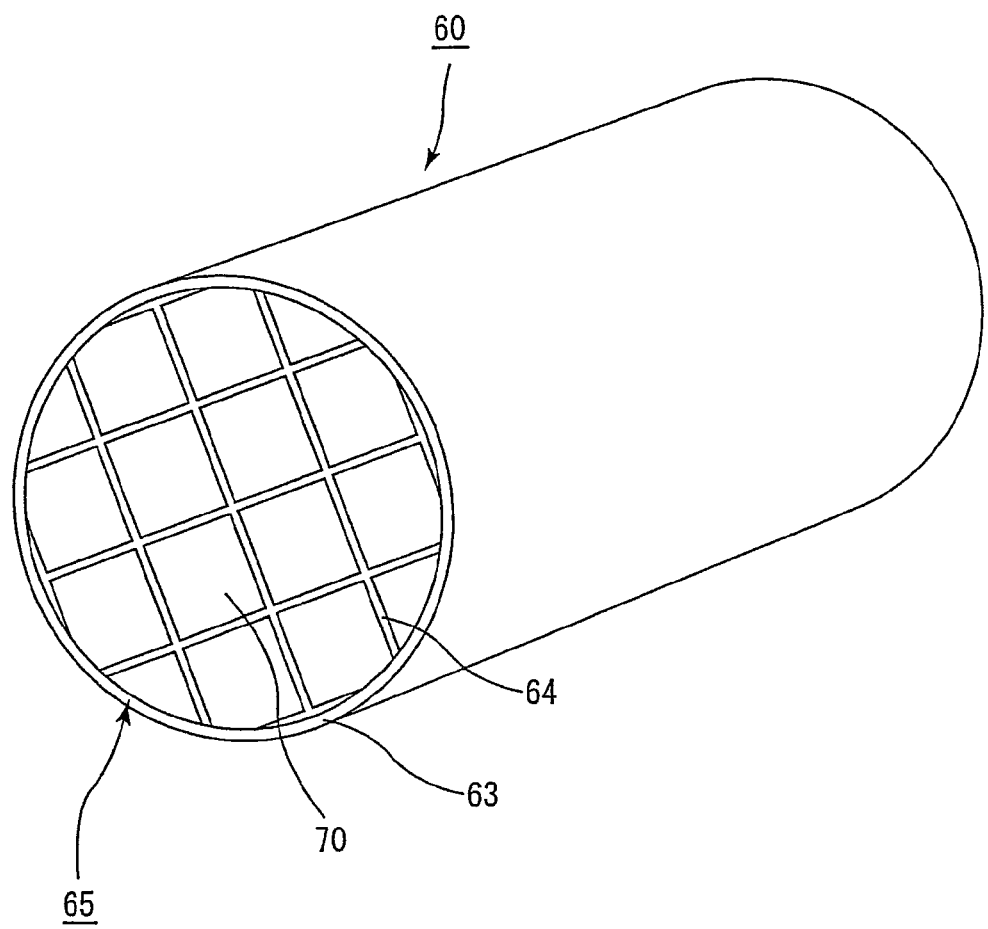
FIG. 4 is a perspective view that schematically shows a conventional filter that has a honeycomb structure.
Figure 5:
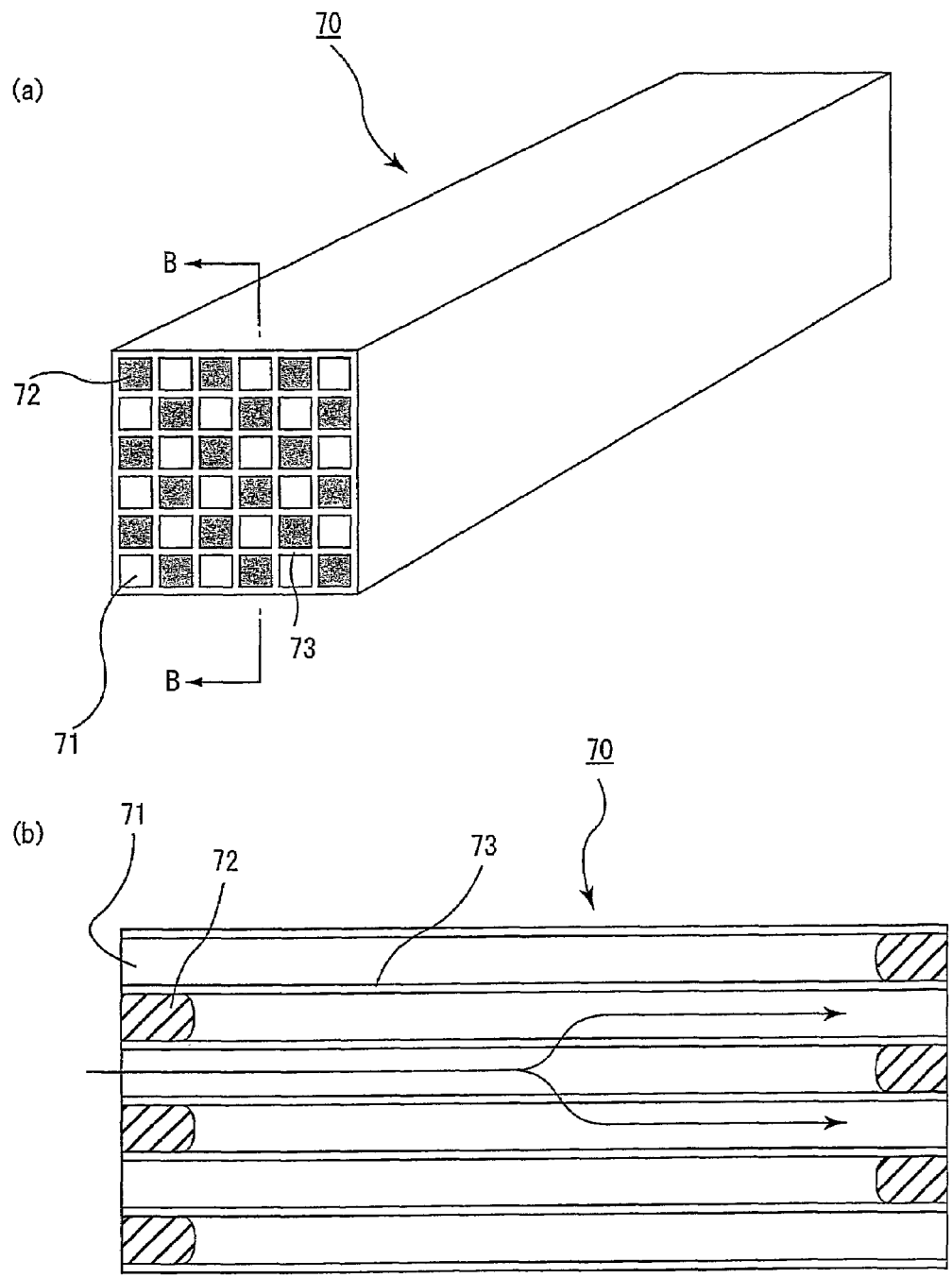
FIG. 5(a) is a perspective view that schematically shows a porous ceramic member that forms the filter having a honeycomb structure shown in FIG. 4.
FIG. 5(b) is a cross-sectional view taken along line B-B of the porous ceramic member shown in FIG. 5(a).
Figure 6:
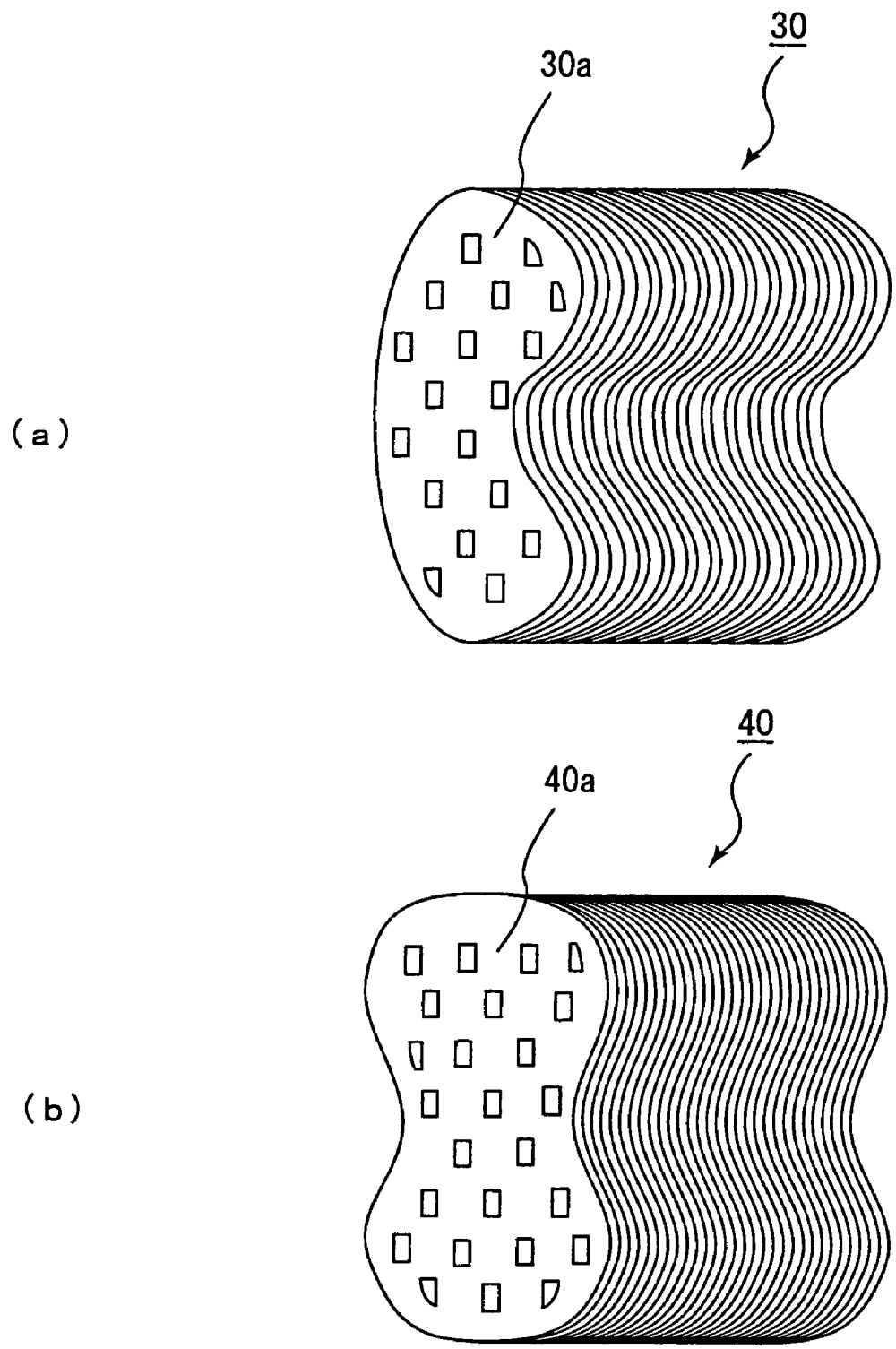
FIG. 6(a) is a perspective view that schematically shows another example of the honeycomb structural body of the present invention.
FIG. 6(b) is a perspective view that schematically shows still another example of the honeycomb structural body of the present invention.
Figure 8:
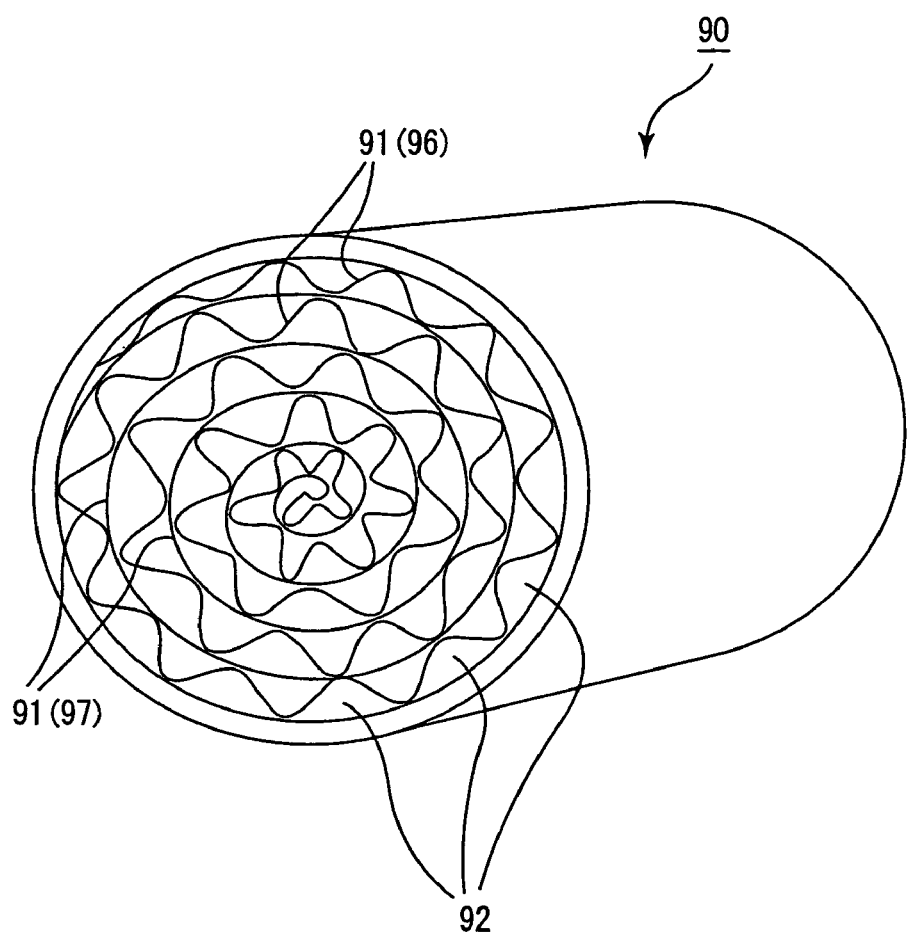
FIG. 8 is a perspective view that schematically shows a honeycomb structural body according to Comparative Example 3.
Figure 9:
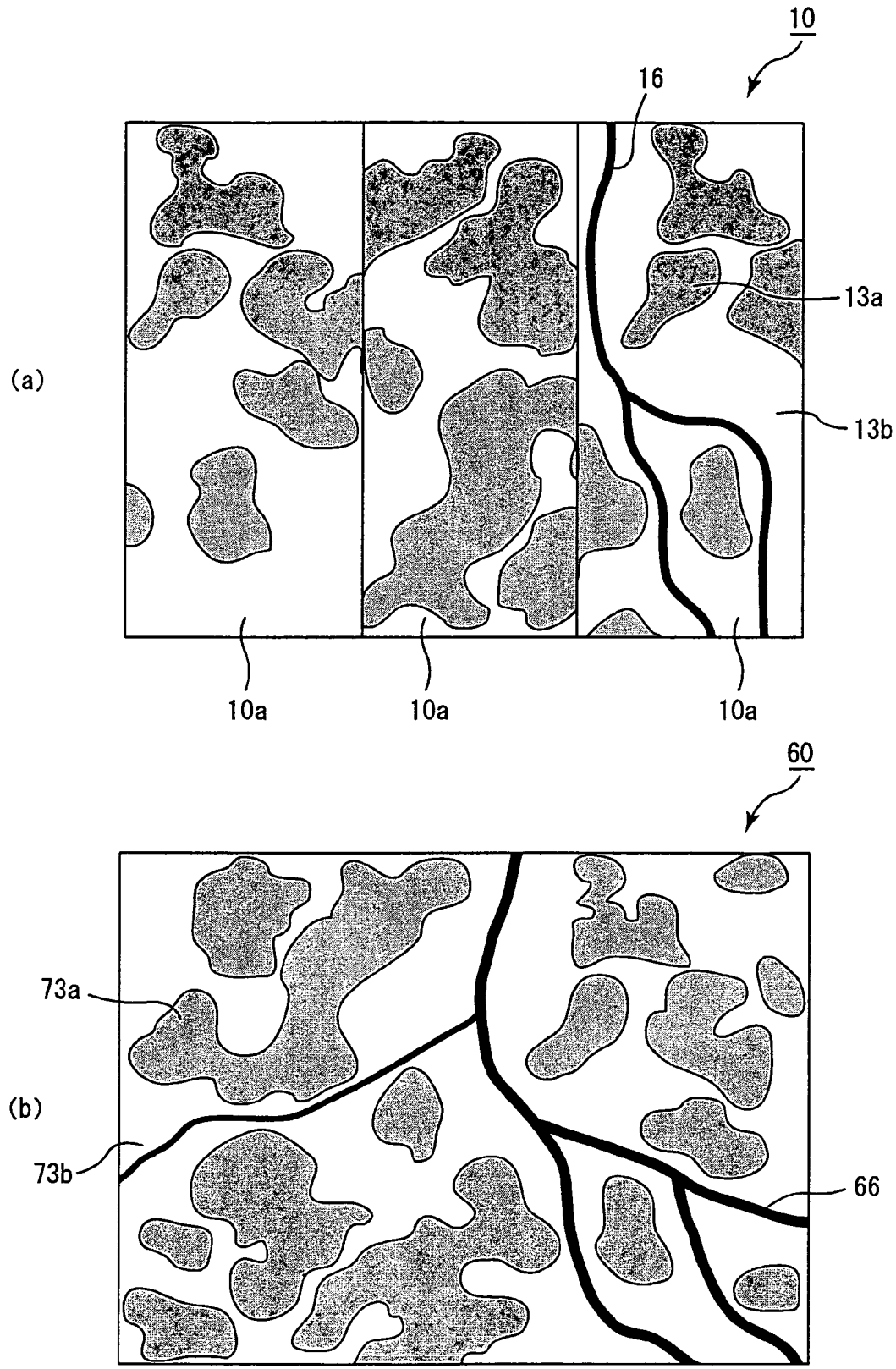
FIG. 9(a) is a cross-sectional view that schematically shows a wall portion interposed between through holes in a honeycomb structural body of the present invention.
FIG. 9(b) is a cross-sectional view that schematically shows a wall portion interposed between through holes in a normal honeycomb structural body made from ceramics, which has an integral structure.

10, 20, 30, 40 honeycomb structural body
10a, 10b, 30a, 40a lamination member
11 bottomed hole (through hole)
13 wall portion
23 casing
200 exhaust gas purifying device

The invention claimed is:
1. A pillar-shaped honeycomb structural body comprising: a structure comprising a plurality of lamination members, the plurality of lamination members having a plurality of holes and including a plurality of metal lamination members comprising a material mainly made of metal, the structure having a plurality of through holes extend- ing in parallel with one another in a length direction of the structure and a partition wall portion interposed between the through holes, wherein the lamination members are laminated in the length direction so that the holes of the lamination members are superposed on one another, and the through holes includes ones sealed at a first end of the structure and ones sealed at a second end of the structure such that the structure is configured to filter particles in an exhaust gas.

2. The honeycomb structural body according to claim 1, wherein the metal lamination members include at least two metal lamination members positioned on the first end and second end of the structure.

3. The honeycomb structural body according to claim 1, wherein the plurality of lamination members of the structure is entirely the metal lamination members.

4. The honeycomb structural body according to claim 1, further comprising a catalyst supported on the lamination members.

5. A pillar-shaped honeycomb structural body comprising:

a structure comprising a plurality of lamination members, the plurality of lamination members having a plurality of holes and including a plurality of metal lamination members comprising a material mainly made of metal, the structure having a plurality of through holes extending in parallel with one another in a length direction of the structure and a partition wall portion interposed between the through holes, wherein the plurality of lamination members includes ones having different shapes or sizes of the holes, the lamination members are laminated in the length direction so that the holes of the lamination members are superposed on one another and a surface of the partition wall portion has an irregularity, and the through holes includes ones sealed at a first end of the structure and ones sealed at a second end of the structure such that the structure is configured to filter particles in an exhaust gas.

6. The honeycomb structural body according to claim 5, further comprising a catalyst supported on the lamination members.

7. The honeycomb structural body according to claim 1, wherein the metal comprises one of chromium-based stainless and chromium-nickel-based stainless.

8. The honeycomb structural body according to claim 5, wherein the metal comprises one of chromium-based stainless and chromium-nickel-based stainless.

9. The honeycomb structural body according to claim 1, wherein the material mainly made of metal comprises one of metal fibers, a metal material with through pores and a sintered metal powder.

10. The honeycomb structural body according to claim 5, wherein the material mainly made of metal comprises one of metal fibers, a metal material with through pores and a sintered metal powder.

11. The honeycomb structural body according to claim 1, wherein the plurality of lamination members has a porosity set in a range between 50% by volume and 98% by volume.

12. The honeycomb structural body according to claim 5, wherein the plurality of lamination members has a porosity set in a range between 50% by volume and 98% by volume.

13. The honeycomb structural body according to claim 1, wherein the plurality of lamination members has an average pore diameter set in a range between 1 μm and 100 μm.

14. The honeycomb structural body according to claim 5, wherein the plurality of lamination members has an average pore diameter set in a range between 1 μm and 100 μm.

* * * * *